(12) United States Patent
Eijkelenberg et al.

(10) Patent No.: US 7,798,893 B2
(45) Date of Patent: Sep. 21, 2010

(54) FULL OPENING AND RECLOSABLE EXPLOSION VENT APPARATUS

(75) Inventors: Tom Eijkelenberg, Westerlo (BE); Guido Dom, Olen (BE)

(73) Assignee: Fike Corporation, Blue Springs, MO (US)

( * ) Notice: Subject to any disclaimer, the term of this patent is extended or adjusted under 35 U.S.C. 154(b) by 1282 days.

(21) Appl. No.: 11/335,082

(22) Filed: Jan. 19, 2006

(65) Prior Publication Data

US 2007/0163648 A1 Jul. 19, 2007

(51) Int. Cl.
F16K 17/14 (2006.01)
E04H 9/00 (2006.01)
F16K 17/40 (2006.01)

(52) U.S. Cl. .................... 454/194; 454/357; 137/68.17; 137/71; 137/797; 52/1

(58) Field of Classification Search ................. 454/194, 454/217, 357, 369; 137/14, 797, 68.16, 68.17, 137/70, 71; 52/1
See application file for complete search history.

(56) References Cited

U.S. PATENT DOCUMENTS

| | | | | | |
|---|---|---|---|---|---|
| 1,219,493 | A | * | 3/1917 | Scott ........................ | 220/89.2 |
| 1,847,628 | A | * | 3/1932 | Salmond ...................... | 169/66 |
| 3,182,581 | A | * | 5/1965 | Von Poederoyen et al. ....... | 52/1 |
| 3,283,551 | A | * | 11/1966 | Kraft et al. ........................ | 72/4 |
| 3,498,207 | A | * | 3/1970 | Hazen ........................ | 454/194 |
| 3,762,304 | A | * | 10/1973 | Clark ........................ | 454/194 |
| 4,044,785 | A | * | 8/1977 | Larsen ........................ | 137/75 |
| 4,276,725 | A | * | 7/1981 | Ash ........................... | 52/167.9 |
| 4,341,041 | A | * | 7/1982 | Bloomfield ................... | 49/141 |
| 4,454,686 | A | * | 6/1984 | Stapenell ..................... | 49/141 |
| 4,498,261 | A | | 2/1985 | Wilson et al. | |
| 4,612,739 | A | | 9/1986 | Wilson | |
| 4,656,793 | A | | 4/1987 | Fons | |
| 4,662,126 | A | | 5/1987 | Malcolm | |
| 4,741,542 | A | | 5/1988 | Kimerly | |
| 4,750,303 | A | | 6/1988 | Mullen | |
| 4,777,974 | A | | 10/1988 | Swift et al. | |
| 4,794,852 | A | * | 1/1989 | Ee ............................... | 454/271 |
| 4,821,909 | A | | 4/1989 | Hibler et al. | |
| 5,036,632 | A | | 8/1991 | Short, III et al. | |
| 5,116,089 | A | | 5/1992 | Taylor | |

(Continued)

FOREIGN PATENT DOCUMENTS

JP 60155846 A * 8/1985

*Primary Examiner*—Steven B McAllister
*Assistant Examiner*—Patrick F. O'Reilly, III
(74) *Attorney, Agent, or Firm*—Hovey Williams LLP

(57) ABSTRACT

Explosion vent apparatus is provided, which includes a vent support unit defining a vent opening adapted to be aligned with an area to be protected from an overpressure condition, a vent panel movably mounted on the support unit in a normal closed position blocking the outlet and movable through a first displacement away from its closed position to a first overpressure-relieving position upon application of an overpressure of one magnitude of pressure while allowing movement of the vent panel through a second and greater displacement to a second overpressure-relieving position upon application of a higher overpressure. The vent panel does not deform or rupture upon opening, and recloses after pressure relief, either under spring pressure when opened under a lower first pressure, or by a fluid actuated reclosing mechanism upon full opening of the vent panel under a higher second pressure.

25 Claims, 20 Drawing Sheets

U.S. PATENT DOCUMENTS

| | | |
|---|---|---|
| 5,195,701 A | 3/1993 | Willan |
| 5,369,917 A | 12/1994 | Janssens |
| 5,461,831 A | 10/1995 | Michal |
| D373,984 S | 9/1996 | Darien |
| 5,967,170 A | 10/1999 | Hume et al. |
| 6,070,365 A | 6/2000 | Leonard |
| 6,223,473 B1 | 5/2001 | Romig |
| 6,318,576 B1 | 11/2001 | Graham et al. |
| 6,367,203 B1 | 4/2002 | Graham et al. |
| 6,425,211 B1 | 7/2002 | Wise et al. |
| 6,574,929 B2 | 6/2003 | Wildenhain et al. |
| 6,607,003 B1 | 8/2003 | Wilson |
| 6,792,964 B2 | 9/2004 | Farwell et al. |
| 7,275,560 B2 * | 10/2007 | Rogge ........................ 137/527 |
| 2004/0172889 A1 | 9/2004 | Eijkelenberg et al. |

* cited by examiner

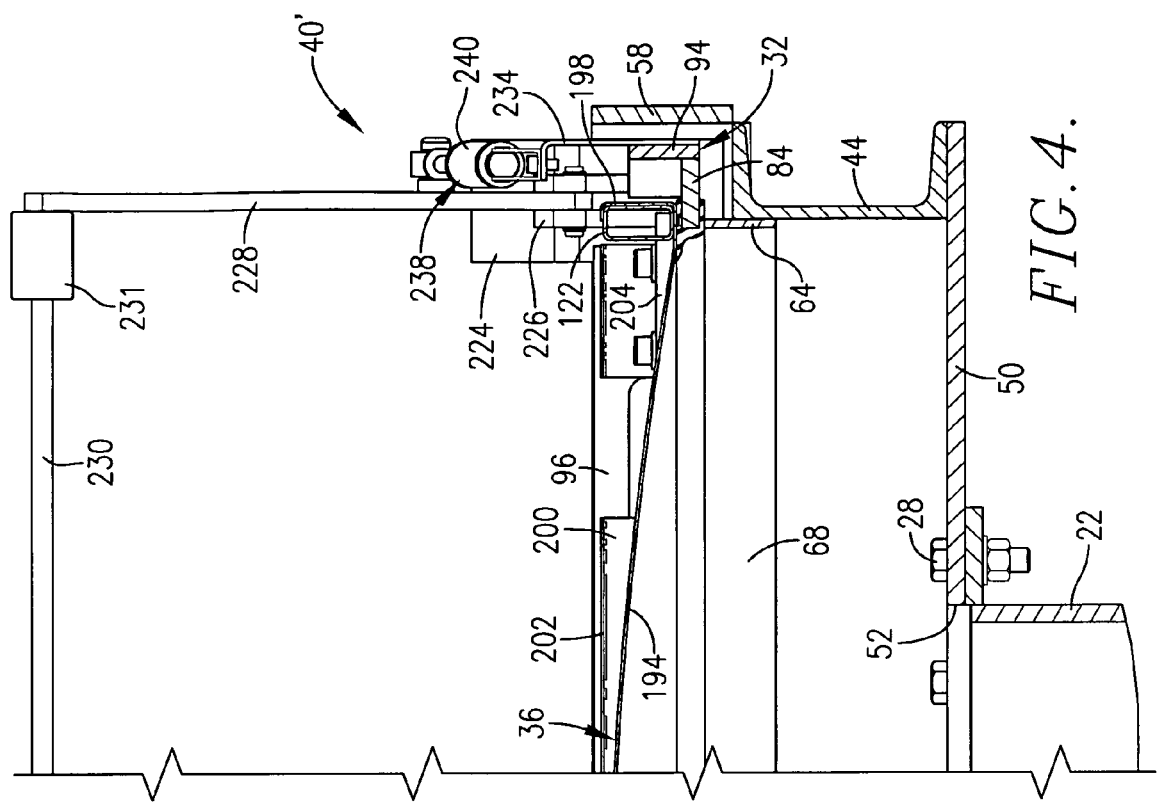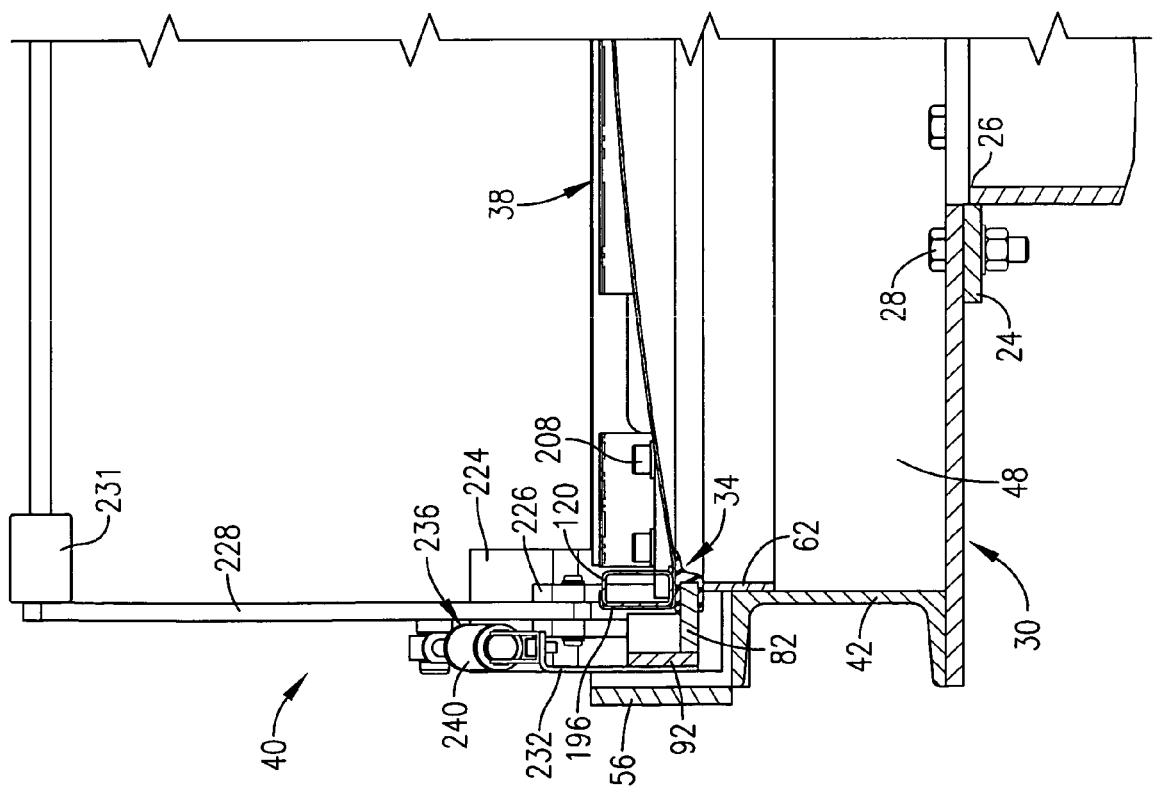

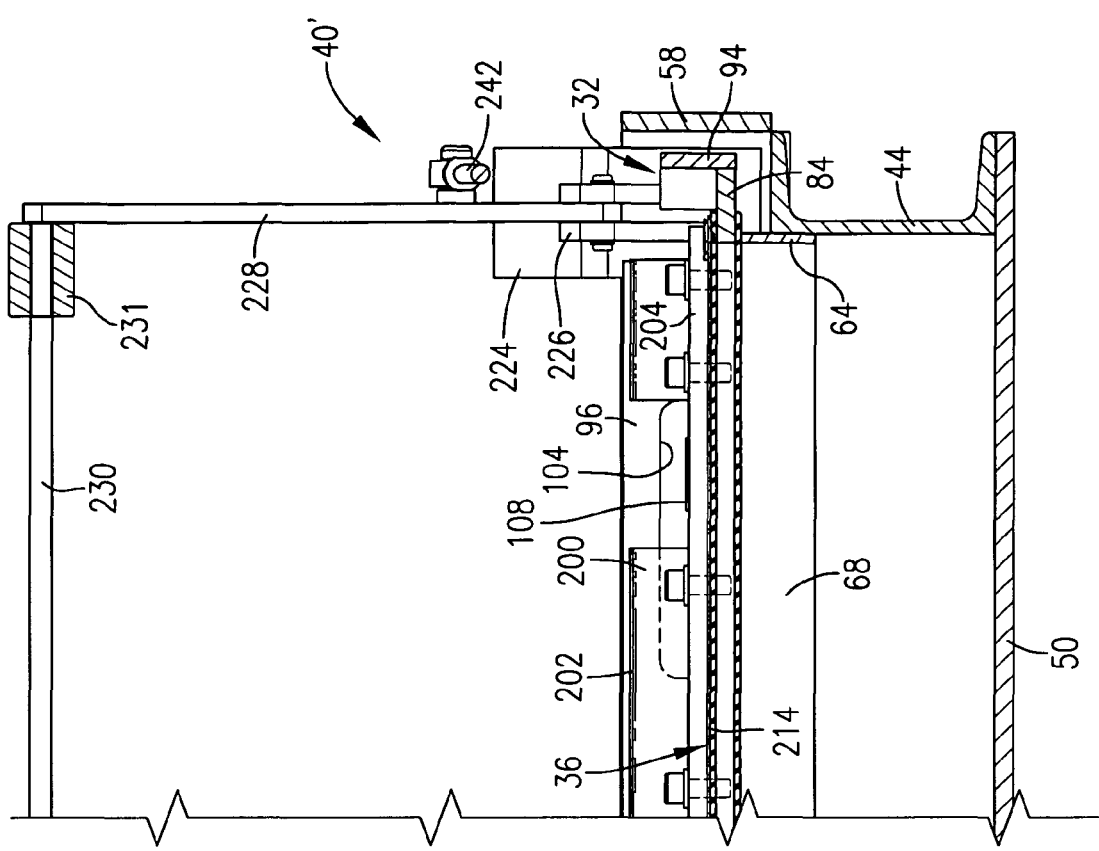
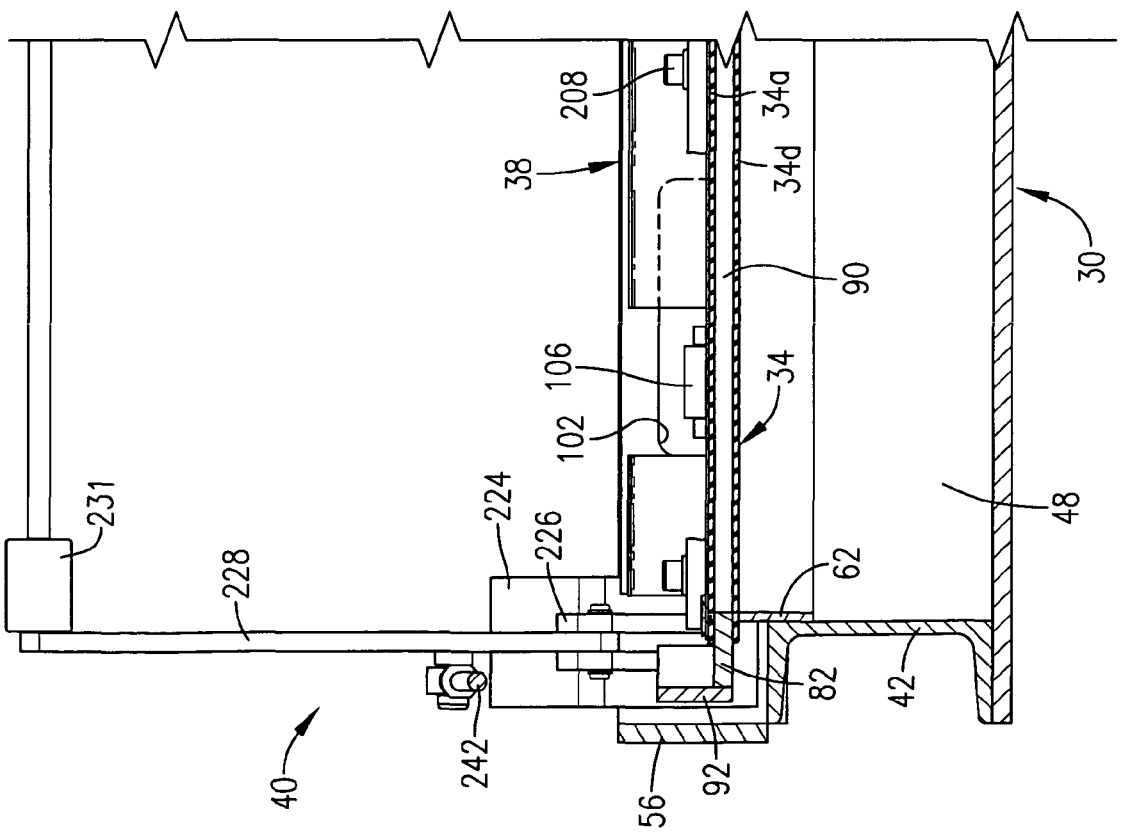
FIG. 5.

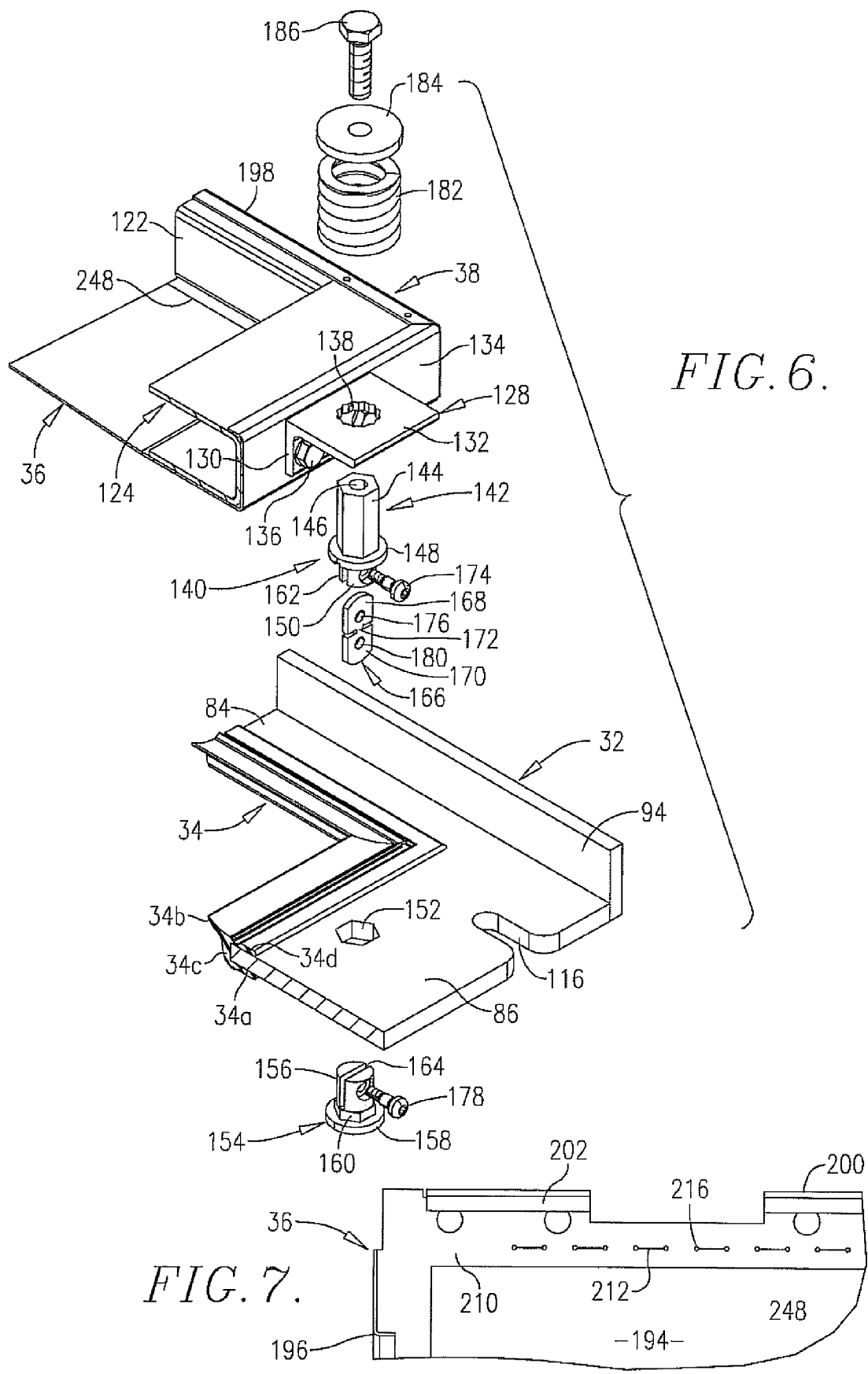

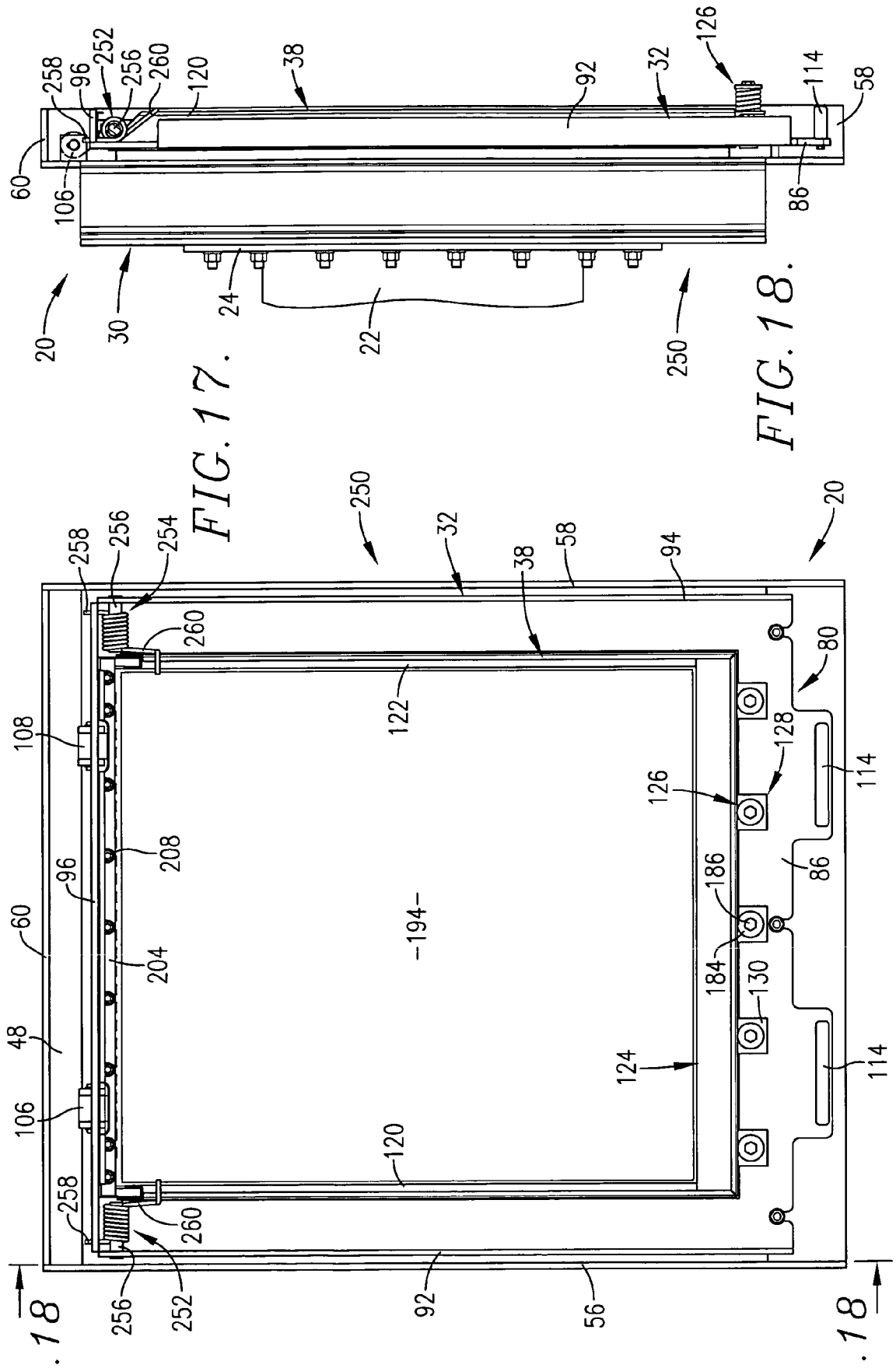

FULL OPENING AND RECLOSABLE EXPLOSION VENT APPARATUS

BACKGROUND OF THE INVENTION

1. Field of the Invention

This invention relates to explosion vents adapted to be mounted vertically or horizontally, or at an angle from vertical or horizontal, and disposed in closing relationship to relief openings in enclosed areas subject to rapid overpressure conditions such as may occur during explosions, a fast burning fire, or the like. Various industrial processes and installations have confined particulate materials, gases, and/or finely divided fluids that can explode or ignite creating a significant explosion or fire. Dangerous overpressure conditions can result from an explosion or an uncontrolled fire. It is therefore desirable to protect areas that confine hazardous materials subject to rapid combustion from what would otherwise be a catastrophic explosion or fire.

More particularly, this invention relates to full opening and reclosable explosion vent apparatus that will consistently open when the area protected by the vent is subjected to a pressure buildup of a predetermined magnitude, without premature opening of the vent when an overpressure condition occurs that is below the set opening pressure of the vent. The explosion vent apparatus is constructed and designed to withstand continuous pressure cycling over an extended period of time below the pressure that effects opening of the vent without adversely affecting the pressure relieving characteristics of the vent.

The vent panel of the vent apparatus of this invention is openable to a first pressure relieving partially open position, without rupture of the vent panel of the apparatus, when subjected to an overpressure condition of one magnitude, and openable to a second fully open pressure relieving position, again without rupture of the vent panel, when the vent panel is subjected to an overpressure condition of a higher magnitude. An especially important advantage of the explosion vent apparatus is its ability to reclose from either of its open positions when the overpressure condition is relieved, thus preventing ambient air from reentering the opening leading to the protected area that could cause a secondary explosion or increase the intensity of a fire. Reclosing of the vent is accomplished either with a pneumatic apparatus, torsion springs, or elastomeric bands.

2. Description of the Prior Art

Explosion vents are commonly used to cover relief openings in enclosures such as bag houses, filter installations, dryer systems, tanks, processing vessels, and conduit systems for preventing dangerous overpressure conditions in such restricted areas. For example, bag houses, filter installations, and dryer systems are constantly at risk of explosions because of the high concentrations of finely divided materials, gases, and fluids that may be present. In order to protect these hazardous areas from damage caused by an explosion or a fast reacting fire that creates an extremely rapid overpressure condition, it is conventional practice to provide one or more pressure relief openings in the equipment that seal the protected area from the surroundings outside the protected area. These explosion vents seal the pressure relief openings when the equipment or systems operate at normal pressures within prescribed limits. When the confined areas are subjected to an overpressure condition of predetermined magnitude, each vent normally closing a pressure relief opening ruptures or bursts allowing the high pressure matter to escape through the relief opening. Explosion vents have been designed to consistently burst at a particular pressure level, substantially regardless of the number of pressure cycles that the vent has been subjected to over a period of time.

Areas containing materials that present an explosion or fast reacting fire producing a rapid overpressure condition are also frequently subjected to vacuum conditions. Consequently, prior vent panels designed to burst when an overpressure of predetermined magnitude occurs, must also be capable of withstanding a certain vacuum without failure. Additionally, bag houses and filter installations, for example, are often cycled between pressuring vacuum conditions, causing the explosion vents to flex back and forth. One common practice is to direct pulses of air against the face of a bag house filter which collects dust particles thereon, to dislodge the particles from the surface of the filter so that the particles fall to a collection area below the filter bags. Thus, explosion vents must be configured to withstand or resist vacuum pressures and cycling between pressure and vacuum conditions without collapsing inwardly into the protected area.

Prior art explosion vents typically have been provided with a relatively thin flat metal sheet with the edges trapped between opposed frame members. The vent panel itself has been supplied in a number of different embodiments, with the material of construction, thickness of the material, and a variety of features such as lines of weakness defined by slits or scores, or the configuration of the lines of weakness, controlling the burst pressure. In all instances, though, pressure relief is accomplished by rupturing or breaking of the vent panel, usually along the lines of weakness if provided.

Certain prior art explosion vents having slits defining a line of weakness have been provided with a plurality of connectors or burst tabs attached over the slits to retain the central area of the panel within the confines of the line of weakness in its closed position until subjected to a buildup of pressure of predetermined magnitude. With this burst tab construction, it was difficult to assure bursting or rupture of the vent panel at a prescribed overpressure level because the burst tabs were not all subjected to uniform forces, causing some of the burst tabs to break prematurely. It is to be recognized in this respect that when one or more of the burst tabs break prematurely, the remaining burst tabs break in an indeterminate successive order. Providing an additional number of these burst tabs has not proved successful because the vent panel then tends to rupture late and not provide adequate protection from an explosion or incipient fire.

The provision of tabs across a line of slits also have limited the vacuum support properties of vent panels because it has been found difficult to provide tabs that offer sufficient resistance to inward buckling of the panel, while at the same time being capable of controlling outward rupture of the vent at a pressure of predetermined positive magnitude. In high vacuum conditions, it has been necessary in certain instances to provide reinforcement for the vent panel which complicates the forward acting burst properties of the panel, and at the same time increases the complexity, weight, and cost of the panel assembly.

SUMMARY OF THE INVENTION

The explosion vent apparatus of this invention differs from conventional vents in which the vent panel ruptures to relieve pressure resulting from an explosion or a fast-burning fire. Score lines or a series of slits defining a line of weakness are often provided to control the opening configuration of the vent panel. In the present explosion vent apparatus, the vent panel partially opens under a predetermined lower level overpressure, and then fully opens at a higher overpressure. In both instances, the unruptured vent panel is returned to its closed position, thereby avoiding the necessity of replacing the vent each time there is an actuation of the vent under an overpressure condition.

The explosion vent apparatus is provided with a vent support frame unit adapted to be positioned over the outlet of an area to be protected from an overpressure condition. The frame unit defines a vent opening adapted to be aligned with the outlet of the protected area. A vent panel is pivotally mounted on the frame unit in a normally closed position blocking the protected area outlet. The vent panel is pivotal from its normally closed position to open overpressure-relieving positions. Structure on the frame unit is connected to the vent panel and maintains the vent panel in its closed position until an overpressure condition of predetermined magnitude is applied to the panel through the outlet. The structure is operable to allow pivoting of the vent panel from its closed position to a partially open overpressure-relieving position upon application of one magnitude of overpressure against the vent panel, while permitting pivoting of the panel to a fully open position upon application of a higher overpressure against the vent panel. In a preferred embodiment, a mechanism is provided for reclosing the vent panel after pressure relief.

Structure normally maintaining the vent panel in its closed position includes at least one rupturable tab component interconnecting the frame unit and the vent panel. The tab component is oriented in disposition such that tension forces are exerted on the tab component when an overpressure is applied to the vent panel. The tab component resists rupture while allowing the vent panel to pivot through a limited arc to a first partially open overpressure-relieving position when an overpressure of predetermined lower magnitude of pressure is applied to the vent panel. The tab component undergoes rupture and allows the vent panel to pivot to a fully open position when a second higher overpressure is applied to the vent panel.

Preferably, a plurality of laterally spaced tab components are provided between the vent panel and the frame unit. Provision of a number of spaced tab components assures that tension forces on the tab components resulting from an overpressure condition are distributed across the array of tab components. A coil spring is provided in association with each tab component and is located between respective tab components and the frame unit, thus providing compensation for difference in tolerances between the parts of the tab structures.

The collective force of all of the coil springs holding the vent panel in its closed position must be overcome when an overpressure is applied to the vent panel before compression of the springs is sufficient to allow pivoting movement of the vent panel to an extent that the vent panel is permitted to swing to a partially open pressure relieving position. The compression characteristics of the coil springs associated with each of the tab components, and the extent to which the springs are compressed during installation of the vent apparatus controls the amount of overpressure applied to the vent panel necessary to further compress the springs to an extent that the vent panel may swing to its partially open pressure relieving position.

The individual tab components have two end segments separated by an intermediate waist portion of lesser width than the two end segments. The tension forces required to effect rupture of the waist portions of all of the individual tab components must exceed the collective rupture resistance of the waist segments of the entire array of tab components. The force necessary to rupture each tab component is a function of the type of material from which the tab is fabricated, the manner in which the tab material is fabricated, the thickness of the tab material, whether the tab material has been treated, as for example heat treatment, and the dimensions of the waist portion of the tab component, particularly the width of the waist portion.

A secondary frame assembly carrying the vent panel is pivotally mounted on the vent support frame unit. Releasable connectors secure the frame assembly in its position where the vent panel closes the opening in the frame unit. By releasing the connectors, the frame assembly with the vent panel mounted thereon may be manually swung through an arc away from the outlet allowing visual inspection of the outlet and the area downstream of the outlet.

BRIEF DESCRIPTION OF THE DRAWINGS

FIG. 4 is a horizontal section through FIG. 3 on the line 4-4 looking upwardly in the direction of the arrows;

FIG. 5 is a horizontal section through FIG. 3 taken through the line of bend of the vent panel defined by slits, looking in an upward direction of the Figure;

FIG. 6 is an enlarged fragmentary exploded view of rupture tab structure including members mounting the tab components, along with an associated spring assembly;

FIG. 7 is a partial enlarged elevation view of the upper left hand corner of the vent panel as shown in FIG. 3, illustrating the spaced bend line of slits in greater detail;

FIG. 17 is a front plan view of the full opening and reclosable explosion vent apparatus having torsion springs carried by the vent support frame and operably connected to the vent panel support structure as alternate structure for reclosing the vent panel;

FIG. 18 is a fragmentary vertical cross-sectional view taken substantially on the line 18-18 of FIG. 17 and looking in the direction of the arrows;

DETAILED DESCRIPTION OF THE PREFERRED EMBODIMENT

Description of Structure

Figure 1:
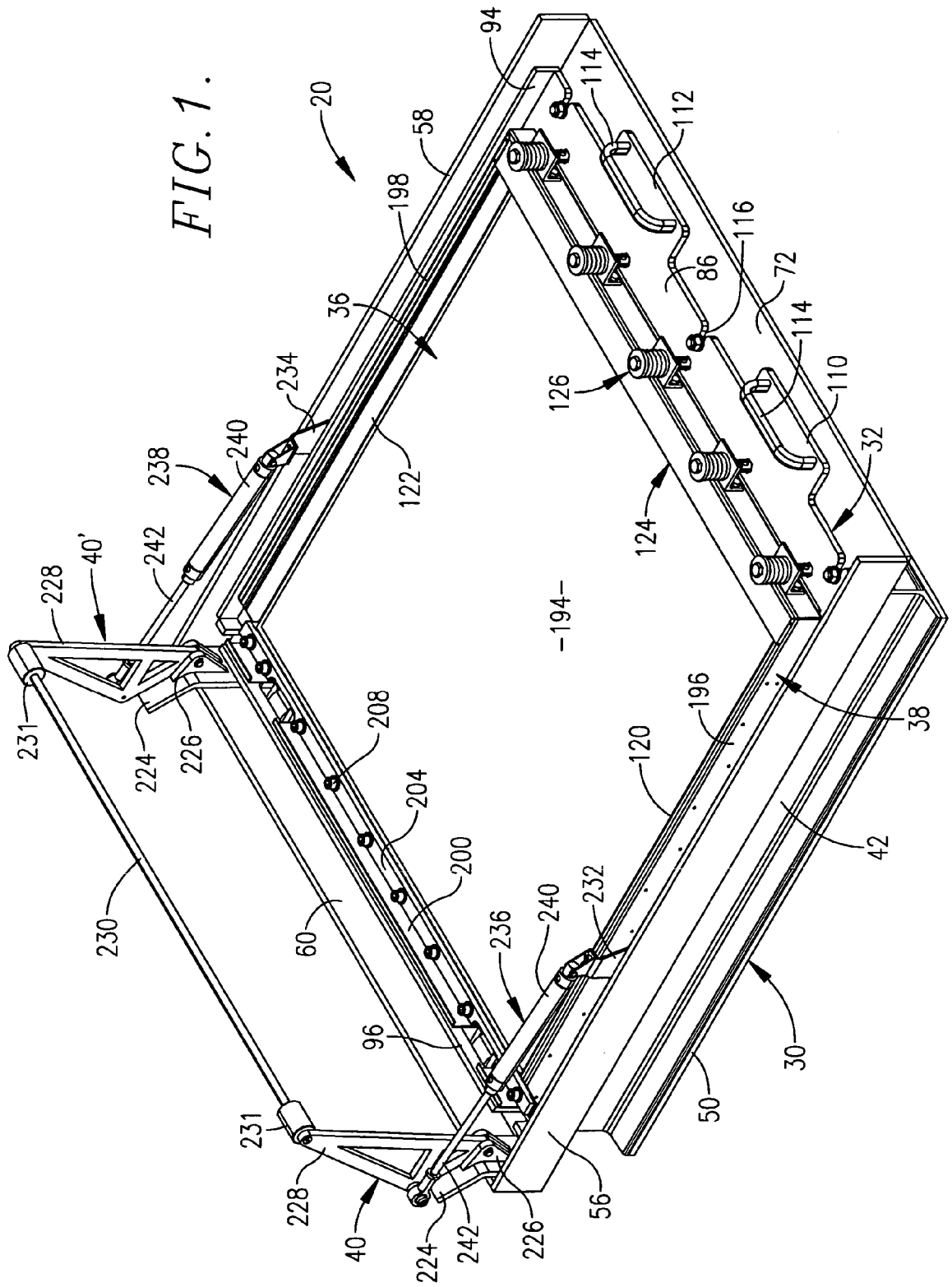
FIG. 1 is a perspective view of the full opening and reclosable explosion vent apparatus of this invention in a fully closed condition.

Explosion vent apparatus in accordance with a preferred embodiment of this invention is designated broadly by the numeral 20 in the drawings. Apparatus 20 is especially useful for mounting on the vertical wall of a system to be protected from a damaging overpressure, including enclosures such as bag houses, filter installations, dryer units, tanks and other storage equipment, processing vessels, or a variety of conduit structures that are at risk for an explosion or rapid combustion event such as a fire. Although positioning of apparatus 20 vertically is preferred, the apparatus may be mounted horizontally, or at any desired angle with respect to horizontal. For simplicity and purposes of illustration only, apparatus 20 is shown as being secured to a conduit 22 having a flange 24. The flange 24 has an overpressure exhaust outlet 26, which for example is of generally circular configuration. Apparatus 20 is mounted on the flange 24 using a series of conventional fasteners such as bolts and nuts 28.

Figure 2:
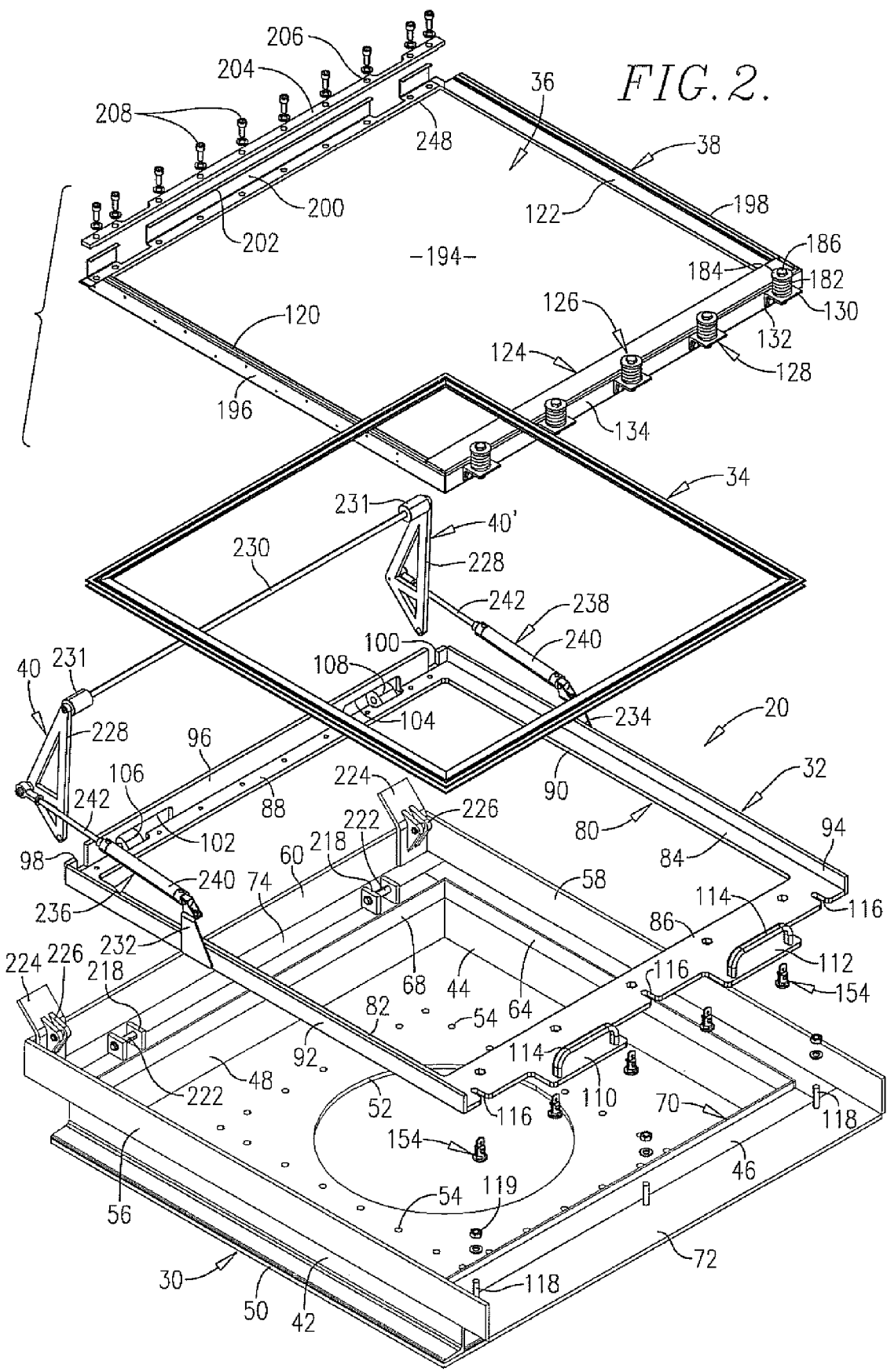
FIG. 2 is an exploded perspective view showing the components making up the assembly as illustrated in FIG. 1.
Figure 3:
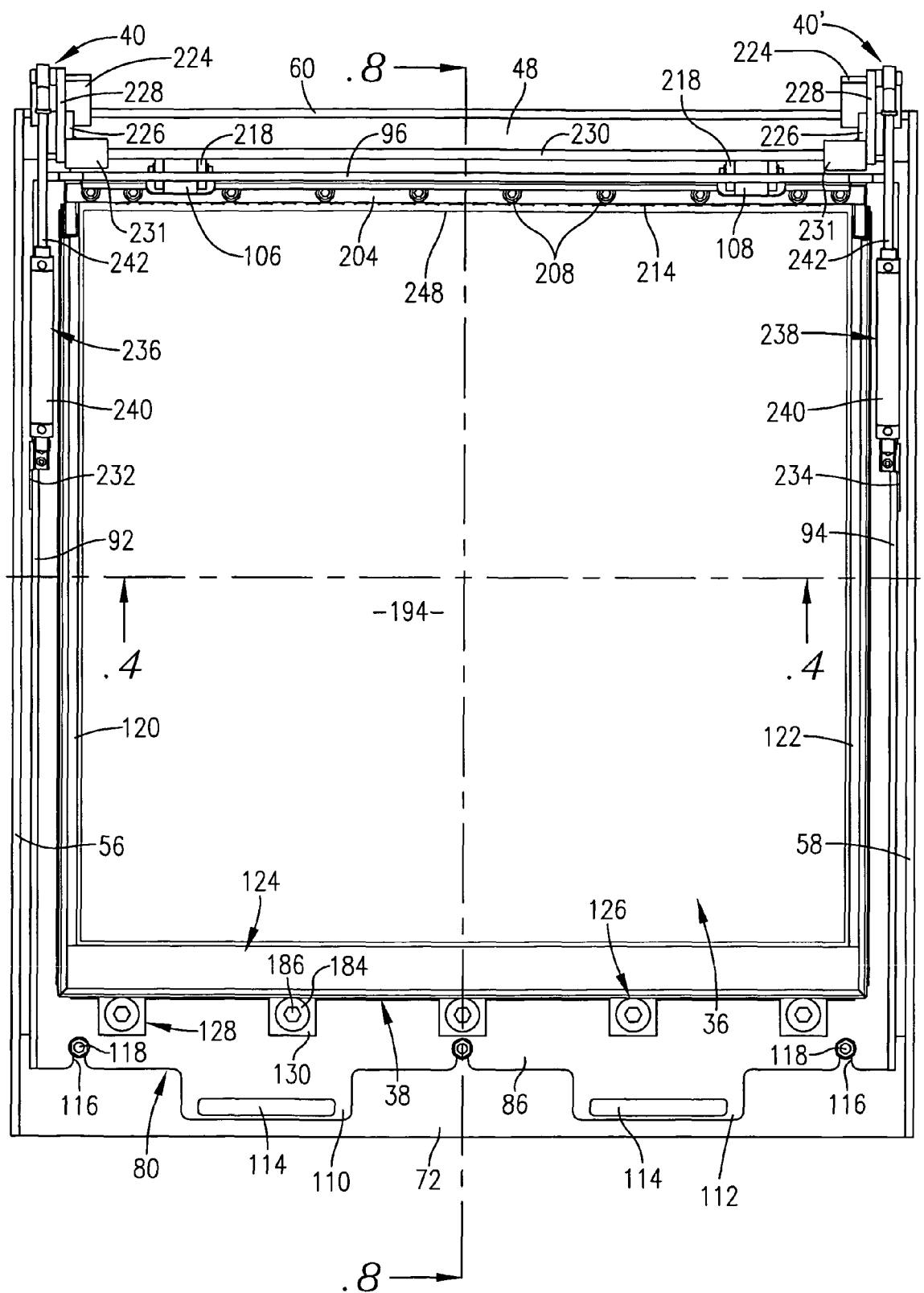
FIG. 3 is a front elevation of the assembly in the closed condition as shown in FIG. 1.

Viewing the overall exploded illustration of FIG. 2, apparatus 20 has as its principal assemblies a vent support unit 30 that for example mounts directly to the flange 24 of the conduit 22, a vent support frame 32, a gasket 34, a vent panel 36, vent panel support structure 38, and recloser mechanism 40 for returning the vent panel 36 to its closed condition after pressure relief opening thereof.

Figure 8:
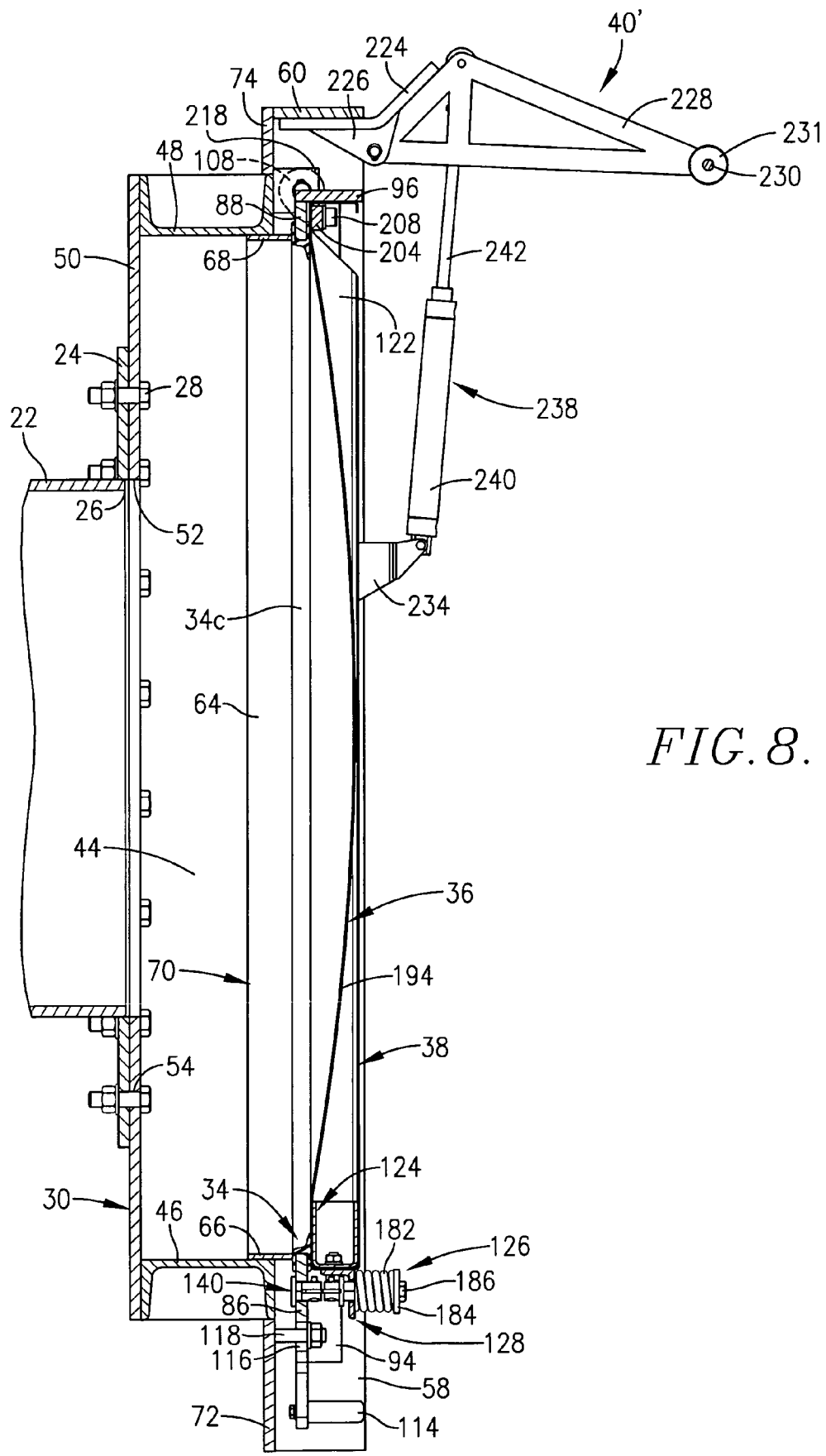
FIG. 8 is a vertical cross-sectional view through FIG. 3 and taken along the line 8-8, looking in the direction of the arrows.

The vent support unit 30 includes a pair of side channels 42 and 44 (FIG. 5) that open outwardly in opposite directions and are in normally upright disposition when apparatus 20 is mounted on a supporting surface. A downwardly opening bottom channel 46 extends between and joins the lower ends of channels 42 and 44, while an upwardly opening top channel 48 is connected to and extends between the normally uppermost ends of channels 42 and 44 (FIG. 8). A rectangular plate 50 is affixed to the innermost webs of the four channels 42-48. Plate 50 has a central opening 52 adapted to align with the exhaust outlet of the surface on which apparatus 20 is mounted. Although opening 52 is illustrated as being circular to correspond with the circular exhaust outlet 26 of conduit 22, the opening 52 can be of any desired configuration depending upon the shape of the exhaust outlet. A series of apertures 54 are provided in plate 50 for receipt of bolt and nut connectors 28.

Two upright side panels 56 and 58 are secured and extend along the length of side channels 42 and 44 on the surfaces thereof remote from plate 50, while a top panel 60 joins respective ends of panels 56 and 58. Side panels 56 and 58 are outboard of channels 42 and 44 while top panel 60 is outboard of top channel 48. Two elongated side strips 62 and 64 are joined to the web portion of channels 42 and 44 and project inwardly from the innermost legs of channels 42 and 44. A bottom strip 66 is similarly secured to the web of bottom channel 46 and projects inwardly from that channel, while top strip 68 is secured to the web of top channel 48 and projects inwardly of the latter. The strips 62-68 are joined end to end to form an outwardly extending rectangular rail 70 inboard of the channels 42-48 and that project away from the webs of the channels as can be observed for example in FIGS. 2-5.

Viewing FIG. 8, it can be seen that a plate 72 is secured to the lower ends of side panels 56 and 58 as well as to the edges of the downwardly projecting innermost legs of side channels 42 and 44. An upright plate 74 attached to the edge of the innermost leg of top channel 48 and that extends between and is connected to the uppermost ends of side panels 56 and 58 as well as to top panel 60. Thus, the parts 42-74 comprise a weldment making up the vent support unit 30.

The parts of vent support frame 32 include a flat panel 80 having unitary side legs 82 and 84, a bottom leg 86, and a top leg 88. The innermost edges of legs 82-88 define a central opening 90. It can be seen from FIG. 2, for example, that the bottom leg 86 is of greater width than the legs 82, 84, and 88. Elongated side bars 92 and 94 are attached to and project outwardly from the outermost edges of side legs 82 and 84. An uppermost narrow plate member 96 is secured to the outermost edge of top leg 88 of vent support frame 32. Plate member 96 has outermost, outwardly opening notches 98 and 100. Elongated openings 102 and 104 are provided in plate member 96 adjacent notches 98 and 100 respectively. Hinge barrels 106 and 108 are secured to top leg 88 of panel 80 within respective openings 102 and 104.

The front margin of bottom leg 86 of panel 80 has two unitary outwardly projecting segments 110 and 112 that each mount an outwardly extending U-shaped handle 114. Inwardly directed, spaced notches 116 are provided in the outermost edge of bottom leg 86 between and on opposite sides of handles 114. Notches 116 receive threaded studs 118 secured to the outermost face of plate 72, with a nut 119 being threaded over each stud 118.

Figure 8A:
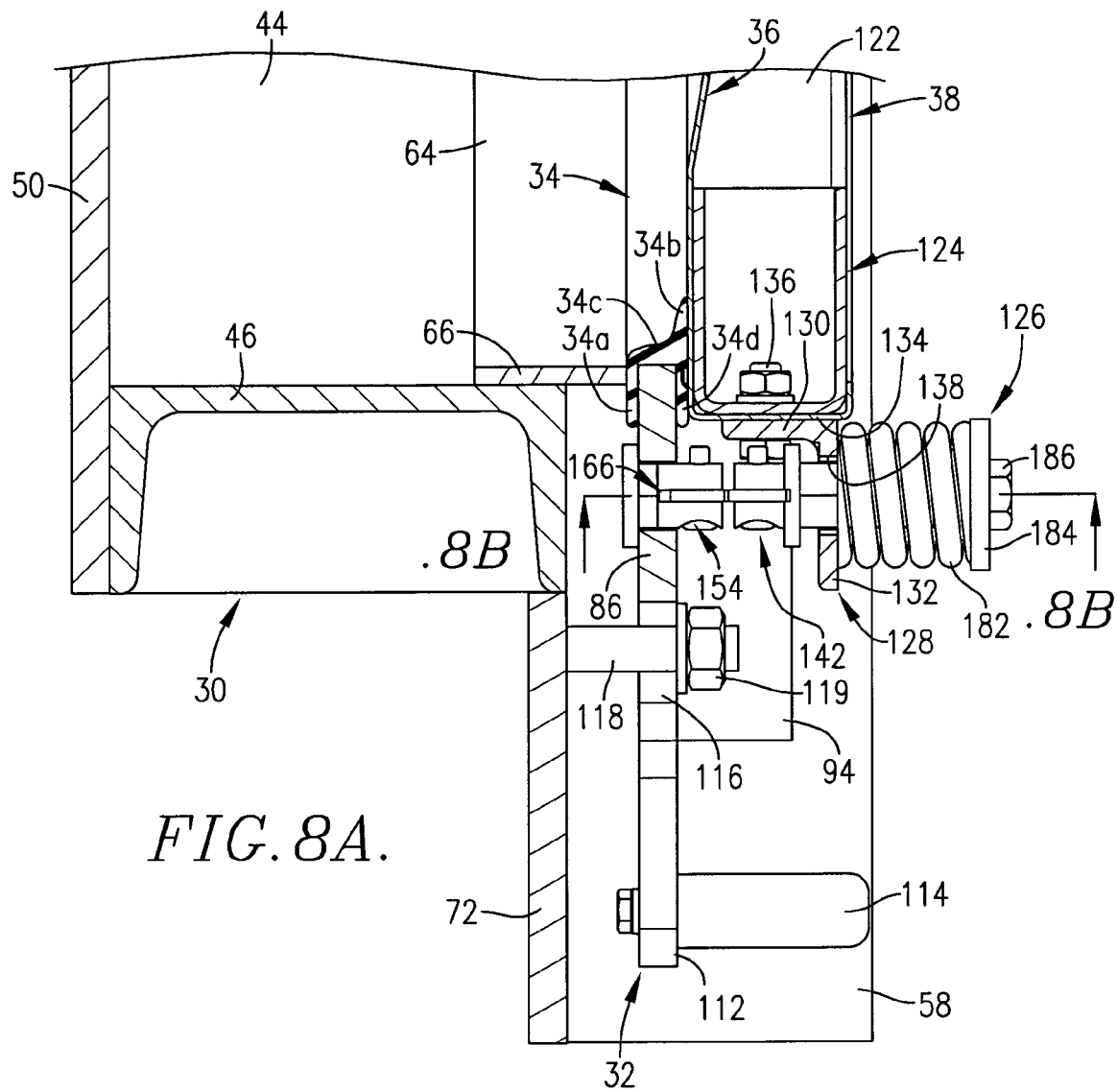
FIG. 8A is an enlarged fragmentary vertical sectional view taken through one of the spring assembly and tab component structures as shown in FIG. 3.

A gasket 34 having four transversely U-shaped legs fits within the opening 90 of vent support frame 32 with the inner and outer legs of the gasket resting against the upper and lower surfaces of legs 82-88 respectively of panel 80. Gasket 34 provides a seal around the entire perimeter of the central section of the vent panel 36. It is to be observed from FIG. 8A that the innermost surface of leg 34*a* of gasket 34 rests against the outer edge of rail 70 when the vent panel 36 is in its closed position. It can also be seen from FIG. 8A that the leg portion 34*b* of gasket 34 that projects inwardly from the bight section 34*c* of gasket 34 cooperates with leg portion 34*d* of gasket 34 to provide a seal with the opposed outer edge surface of vent panel 36. As is best shown in FIG. 9A, the leg 34*d* of gasket 34 has an outwardly-facing in-turned groove 34*e* that enhances the sealing between opposed surfaces of gasket 34 and vent panel 36, when the vent panel 36 is in its closed condition.

Vent panel support structure 38 has a pair of elongated tubular side members 120 and 122. A transversely U-shaped bottom channel member 124 extends between and is connected to corresponding ends of side members 120 and 122. It can be seen from FIGS. 2 and 8 that the ends of tubes 120 and 122 remote from channel member 124 are beveled as top leg 88 and plate 96 are approached.

A series of tab component and spring assembly structures 126 are provided on the outer face of bottom channel member 124. Five of the assemblies 126 are shown in FIG. 2 as being equally spaced along the length of channel member 124, although it is to be understood that more or less of the assemblies 126 may be provided if desired. Each assembly 126 includes a mounting bracket 128 that has a horizontal leg 130 and a vertical leg 132. The lowermost margin 134 of vent panel 36 wraps around the outer face of channel member 124, as shown in FIGS. 6 and 8A. Bolts 136 with a nut thereon extend through a respective horizontal leg 130 of a corresponding bracket 128, and through the margin 134 of vent panel 36 and the bight of channel member 124, to firmly affix each assembly 126 to channel member 124.

The vertical leg 132 of each bracket 128 has an opening 138 for clearing an outer tab fastener 140 comprising an outer tab holding member 142 of assembly 126. Member 142 has an elongated, transversely hexagonal main section 144 provided with an inwardly opening central threaded passage 146, an annular, outwardly projecting central flange section 148, and an innermost bifurcated section 150. Opening 138 is provided with a number of inwardly directed projections defining notches therebetween that are configured to complementally engage the corners of main section 144 of tab holding member 142. The inter-engagement between the corners of main section 144 with the notch-defining projections of opening 138 prevent rotation of holding member 142 with respect to a corresponding mounting bracket 128.

Bottom leg 86 of vent support frame 32 has a transversely octagonal aperture 152 for each of the tab component and spring assemblies 126 with the apertures 152 being equidistantly spaced with the number of apertures 152 corresponding to the number of assemblies 126. Each aperture 152 receives an inner tab holding member 154 that is provided with a bifurcated main section 156. The outwardly projecting annular flange section 158 is outboard of a central section 160 octagonal configuration. The tab holding member 154 is adapted to be received in a respective aperture 152 with the central section 160 complementally engaging the facets of the aperture 152. When tab holding member 154 is seated in a respective aperture 152, the tab holding member 154 is restrained against rotation by engagement of the corners of central section 160 with the notched areas of aperture 152.

Figure 8B:
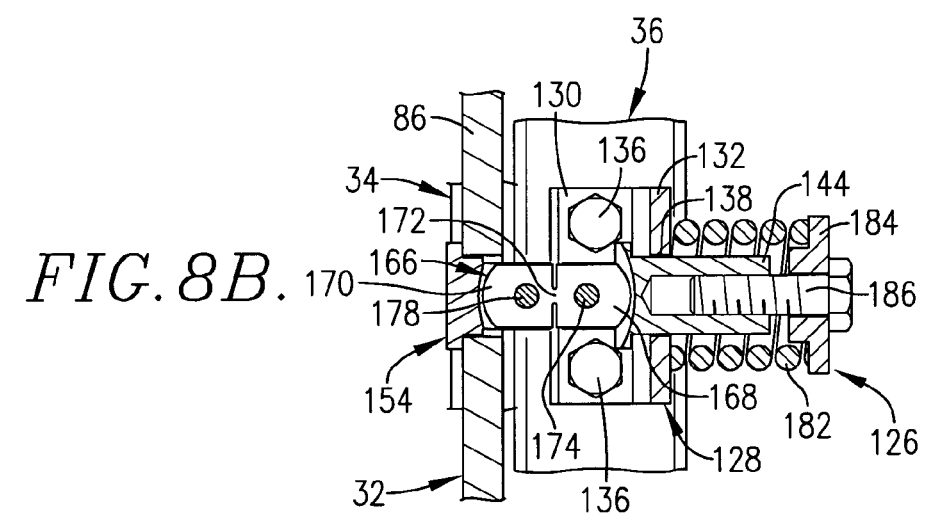
FIG. 8B is an enlarged fragmentary sectional view taken on the line 8B-8B of FIG. 8A and looking in the direction of the arrows.

The axially extending slot 162 in section 150 and the axially extending slot 164 in tab holding member 154 are adapted to align with one another for receipt of a rupture tab component 166. It can be seen from FIG. 8B, for example, that each tab component 166 has two opposed end segments 168 and 170 separated by a waist portion 172 of reduced width as compared with the end segments 168 and 170. End segment 168 of tab component 166 is removably received in slot 162 of tab holding member 142, while end segment 170 of tab component 166 is removably received in slot 164 of tab holding member 154. Bolt 174 extends through aligned openings therefor in tab holding member 142 and through an opening 176 in end segment 168 of each tab component 166. Similarly, bolt 178 extends through aligned openings in bifurcated section 156 of tab holding member 154 and through an opening 180 in end segment 170. Thus, bolts 174 and 178 serve to releasably connect tab component 166 to tab holding member 142 and 154.

After connecting each tab component 166 to holding member 142 and holding member 154, and the main section 144 has been inserted in opening 138, a coil spring 182 is positioned over the main section 144 of a member 142 in disposition engaging leg 132 of a respective mounting bracket 128. A washer 184 placed over the outer edge of coil spring 182 is held in place by a bolt 186 threaded into opening 146 in main section 144 of member 142. Each bolt 186 retains its respective spring 182 in a partially compressed condition. The annular flange section 158 of tab holding member 154, positioned beneath bottom leg 86 of vent support frame 32, resists the resilient force of coil spring 182. It can be seen from FIG. 8A that the central flange section 148 of tab holding member 142 is maintained in spaced relationship from the bottom surface of leg 132 of mounting bracket 128 of each of the assemblies 126. However, as will be explained, upon rupture of tab component 166, the tab holding member 142 is released for upward movement to a position as shown in FIG. 10A with central flange section 148 engaging the underside of leg 132 of a respective mounting bracket 128.

Vent panel 36, which is carried by vent panel support structure 38 in the preferred embodiment of the invention, is of rectangular configuration as illustrated in the drawings and has a central section 194 within the confines of support structure 38. As can best be seen in FIGS. 3 and 4, the central section 194 of vent panel 36 is bulged in an outward direction with the transition area of the bulge being indicated by the numeral 248. As previously described, the lowermost margin 134 of vent panel 36 is partially wrapped around the upwardly facing channel 124 of support structure 38, with the lowermost lip of the vent panel 36 being re-bent upon itself and positioned over the outermost edge of channel 124. Similarly, the side margin 196 of vent panel 36 is wrapped over the outside of tubular member 120, while the side margin 198 of vent panel 36 is wrapped over the outside of tubular member 122. Margins 196 and 198 of vent panel 36 are also re-bent upon themselves over the outermost top edges of tubular members 120 and 122. Margins 196 and 198 of vent panel 36 are beveled in conformity with the beveled upper ends of tubular side members 120 and 122, as best shown in FIG. 8.

The uppermost margin 200 of vent panel 36 is bent upwardly, as illustrated in FIGS. 2, 4, 5, and 8, and has an outermost edge portion 202 that is bent upon itself and directed toward the interior of section 194 of vent panel 36. The outwardly projecting uppermost margin 200 of vent panel 36 is backed up by plate 96. An elongated strip 204 located over the top of vent panel 36 adjacent the uppermost margin 200 thereof, has a series of openings 206 (FIG. 2) along the length of strip 204 that receive fasteners 208 that are threaded into upright leg 88 secured to outwardly projecting plate member 96.

The uppermost planar edge portion 210 of vent panel 36 has a series of spaced, elongated, aligned slits 212 that define a panel bend line of weakness 214 across the top of vent panel 36. It is preferred that opposed ends of each slit 212 have small circular opening 216 that cooperate to prevent tearing of material between adjacent spaced ends of slits 216 during opening of vent panel 36.

Vent support unit 30 is provided with two pairs of ears 218 and 220 mounted on the outer face of top channel 48, with each adjacent pair of ears carrying a hinge pin 222 received in a respective hinge barrel 106 and 108. Vent support frame 32 is thus swingable about the aligned axes of hinge pins 222.

Two recloser mechanisms 40 and 40' are provided at the top of explosion vent apparatus 20 on opposite sides vent support unit 30 and vent support frame 32. Recloser mechanisms 40 and 40' each include an angular bracket plate 224 provided with a leg affixed to the inner surface of top panel 60 at the zone of merger of panel 60 with side panels 56 and 58 respectively. Each bracket 224 has a pair of pin support ears 226. The recloser mechanisms 40 and 40' are of identical construction. Thus, each of the mechanisms 40 and 40' include a triangular recloser bar support 228. The inner apex of each bar support 228 has an opening therein for receiving a pivot pin carried by a corresponding pair of ears 226 on brackets 224. The outer apex of each of the triangular supports 228 carry an elongated crossbar 230 that extends the full width of vent support frame 32, with rollers 231 on the outer ends of crossbar 230. Two opposed horizontally aligned triangular brackets 232 and 234 secured to the outer face of side bars 92 and 94 in spaced relationship from upper plate 96 serve as a mount for one end of fluid actuated cylinder assemblies 236 and 238. Each assembly 236 and 238 has a cylinder 240 pivotally attached to a corresponding support bracket 232 and 234, and a piston rod 242 pivotally attached to the uppermost apex of a respective triangular recloser support 228. Retraction of piston rods 242 into each of the cylinders 240 of reclosers 40 and 40' causes pivoting of recloser supports 228 through an arc to bring bar 230 into proximity to vent panel 36 carried by vent support frame 32.

Operation of Apparatus

Rupture tab components 166 are fabricated to meet rupture specifications for a particular venting application of the explosion vent apparatus 20. To that end, material is chosen for fabrication of the individual tabs 166 of a particular type of metal, of a selected thickness, and the tabs are manufactured with a waist portion 172 of a predetermined thickness such that the waist portion 172 of each tab 166 will rupture under a predetermined force. These parameters are correlated so that the given number of tabs 166 for each explosion vent apparatus 20 will collectively rupture at a given value.

Similarly, in the construction of explosion vent apparatus 20 for a given explosion protection specification, bolts 186 are torqued to a predetermined value such that the collective resistance to compression of all of the springs 182 controls the force that must be applied to the central section 194 of vent panel 36 to effect opening and venting thereof.

The explosion vent apparatus 20 configured for a specific application is then bolted in place over the area to be protected from a designated overpressure. Generally, apparatus 20 will be positioned vertically as depicted in FIG. 8, with the recloser mechanism 40 oriented at the top of the apparatus, while tab component and spring assemblies 126 are at the bottom of the apparatus. In the exemplary embodiment of apparatus 20 illustrated in the drawings, the vent apparatus 20 is shown as being connected to a conduit 22. However, in many instances, apparatus 20 would be mounted in an upright position over a vertical opening in the wall of a bag house, filter installation, dryer unit, storage tank, processing vessel, or other equipment requiring protection from overpressures resulting from explosions or uncontained fires.

The standby position of explosion vent apparatus 20 is shown for example in FIGS. 1 and 8. The perimeter of the vent panel 36 is maintained in sealing engagement with the bottom leg 244 of gasket 34 by virtue of the pressure of springs 182 applied to tab components 166 trapped between tab holding member 142 and tab holding member 154, noting in this respect that the flange section 158 of member 154 engages the underside of bottom leg 86 of vent support frame 32. The recloser mechanisms 40 and 40' carrying bar 230 are in their retracted positions as shown in FIGS. 2 and 8.

Figure 9:
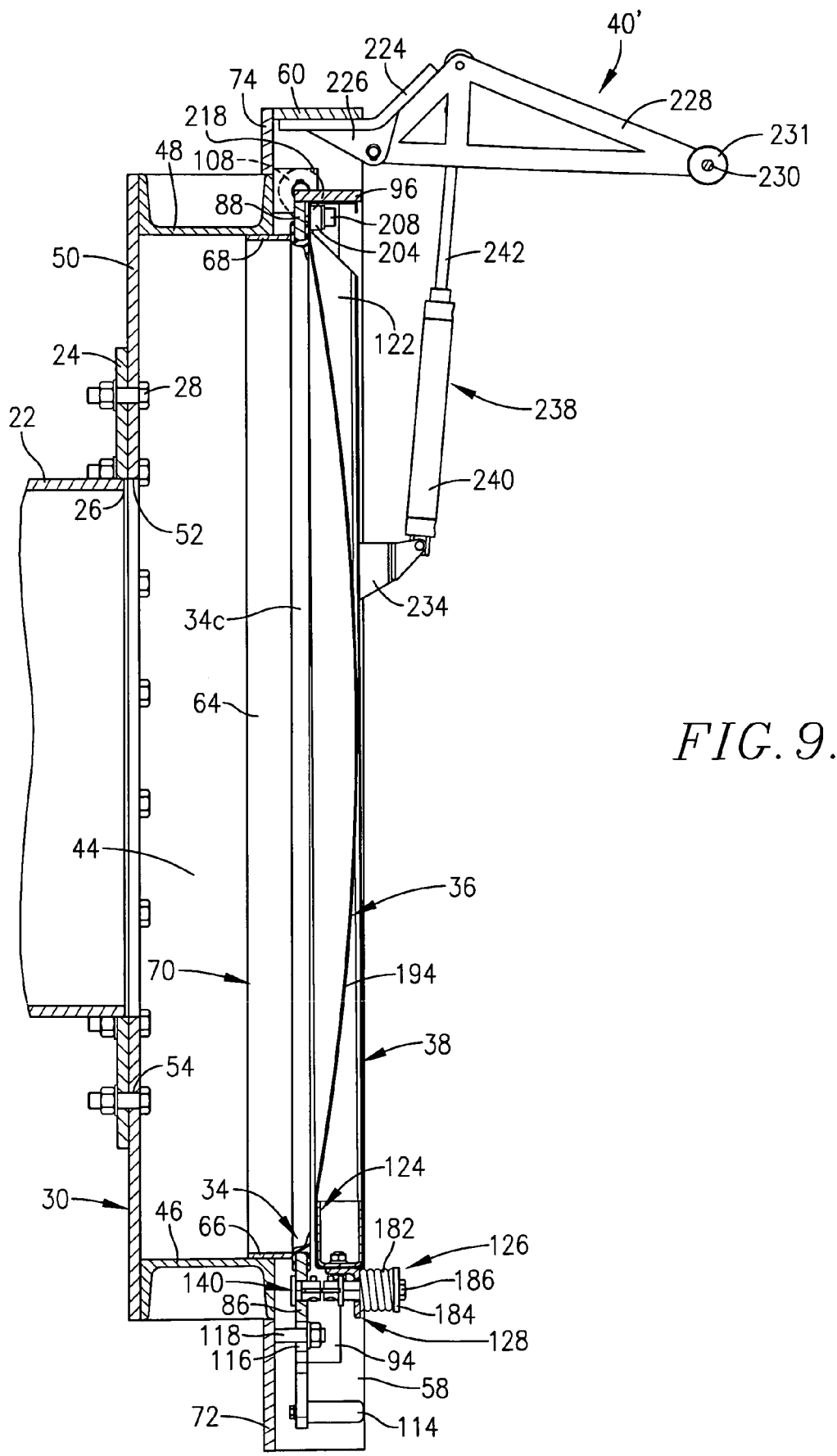
FIG. 9 is a vertical sectional view similar to the sectional view in FIG. 8, except that the vent panel is shown in its partially open pressure relieving position with the individual springs being compressed.
Figure 9A:
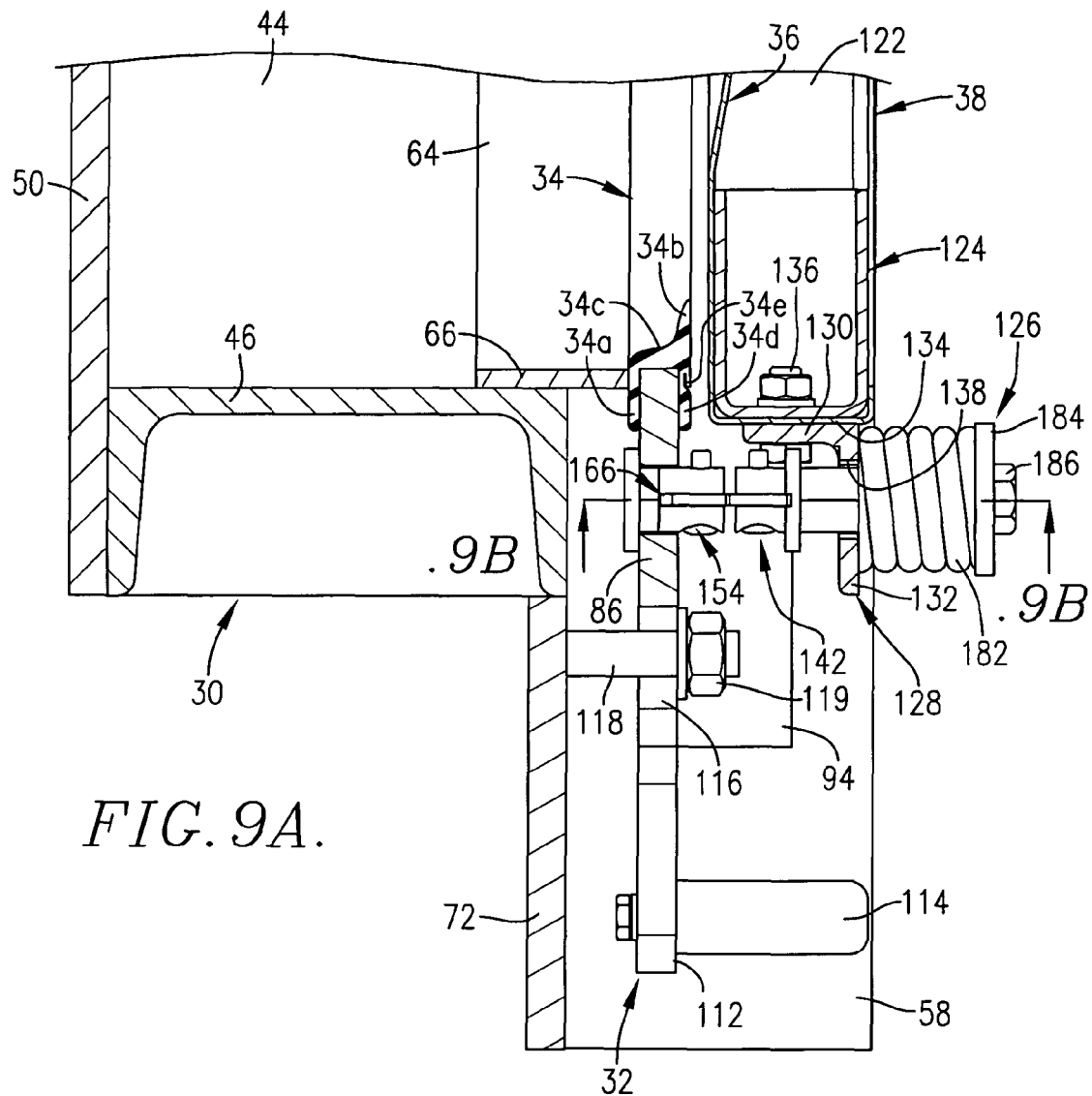
FIG. 9A is an enlarged fragmentary vertical sectional view taken through one of the spring assembly and tab component structures with the spring compressed and with the vent panel partially opened for pressure relief.
Figure 9B:
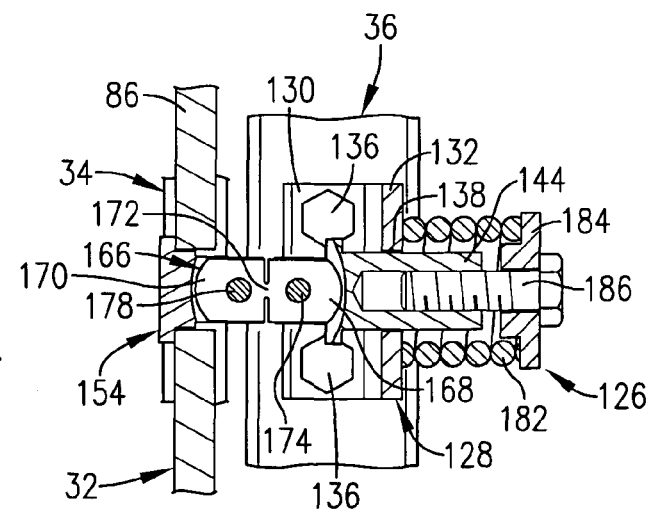
FIG. 9B is a sectional view through the spring assembly and tab component structure of FIG. 9A and taken on the line 9B-9B of FIG. 9A, looking in the direction of the arrows.

In the event of an overpressure of predetermined magnitude sufficient to compress all of the springs 182 along the length of respective sections 144 of tab holding member 142 to a degree that the vent panel support structure 38 may pivot about the axes of hinge barrels 106 and 108 to the partially open position of the vent panel 36 as shown in FIG. 9, a gap opens up between the underside of vent panel 36 and the top leg 34d of gasket 34 carried by panel 82 of vent support frame 32, allowing the overpressure against the underside of central section 194 of vent panel 36 to be relieved, all without rupture of the vent panel 36. As soon as the overpressure is relieved, the vent panel recloses to the position shown in FIG. 8 under the urging of the spring pressure of springs 182. It is therefore evident that a predetermined overpressure may be relieved that is lower than an overpressure that would effect complete opening of the vent apparatus 20. Furthermore, upon relief of that overpressure, the vent apparatus 20 immediately closes and returns to its overpressure protecting status. As a consequence, immediate reclosing of the vent panel 36 prevents a back draft of air into the protected area that could either reinitiate an explosion or contribute to a fire condition.

Figure 10:
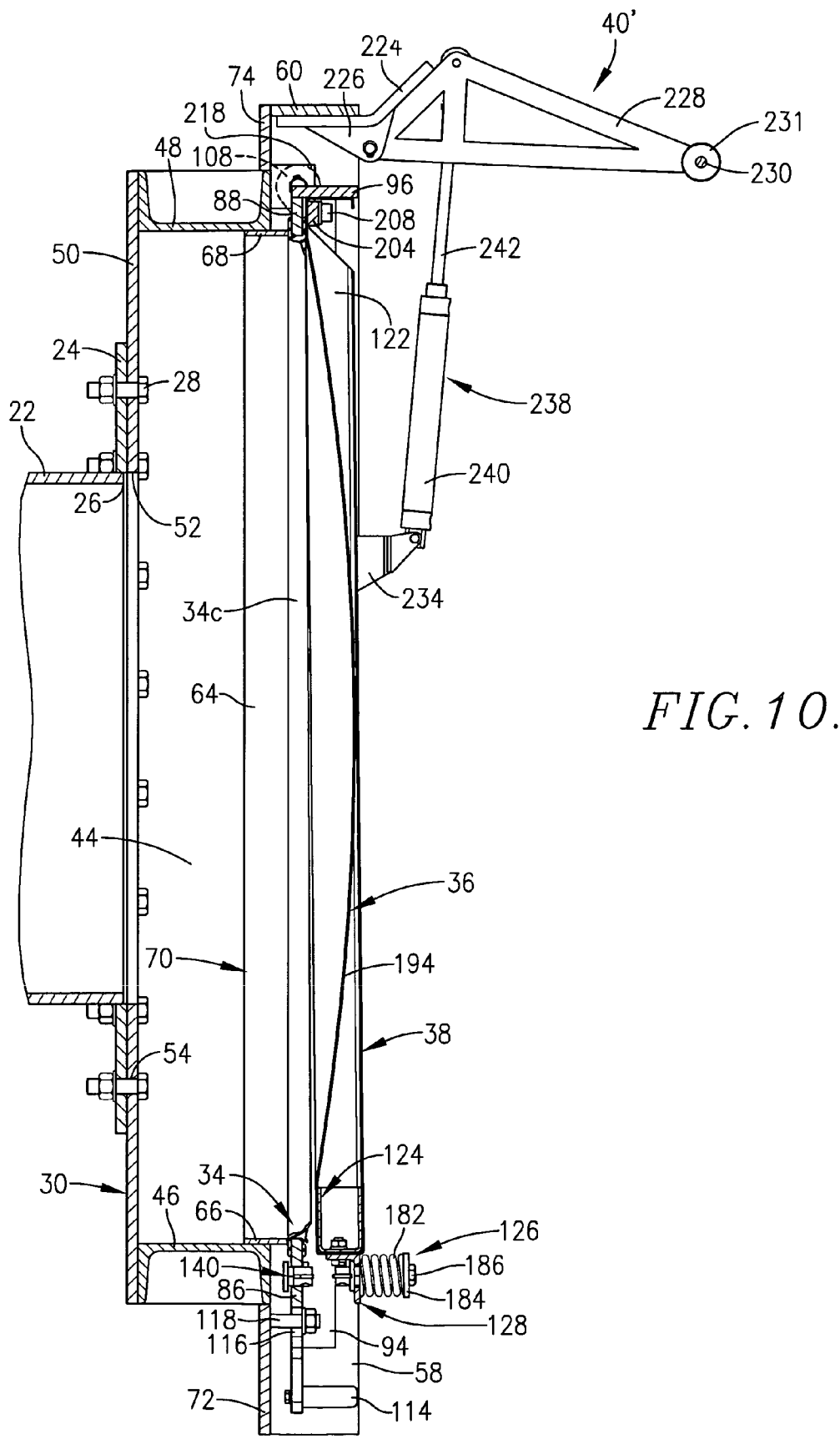
FIG. 10 is a vertical sectional view, similar to FIGS. 8 and 9, and illustrating the position of the vent panel as it starts to open immediately after all of the tab components have been ruptured.
Figure 10A:
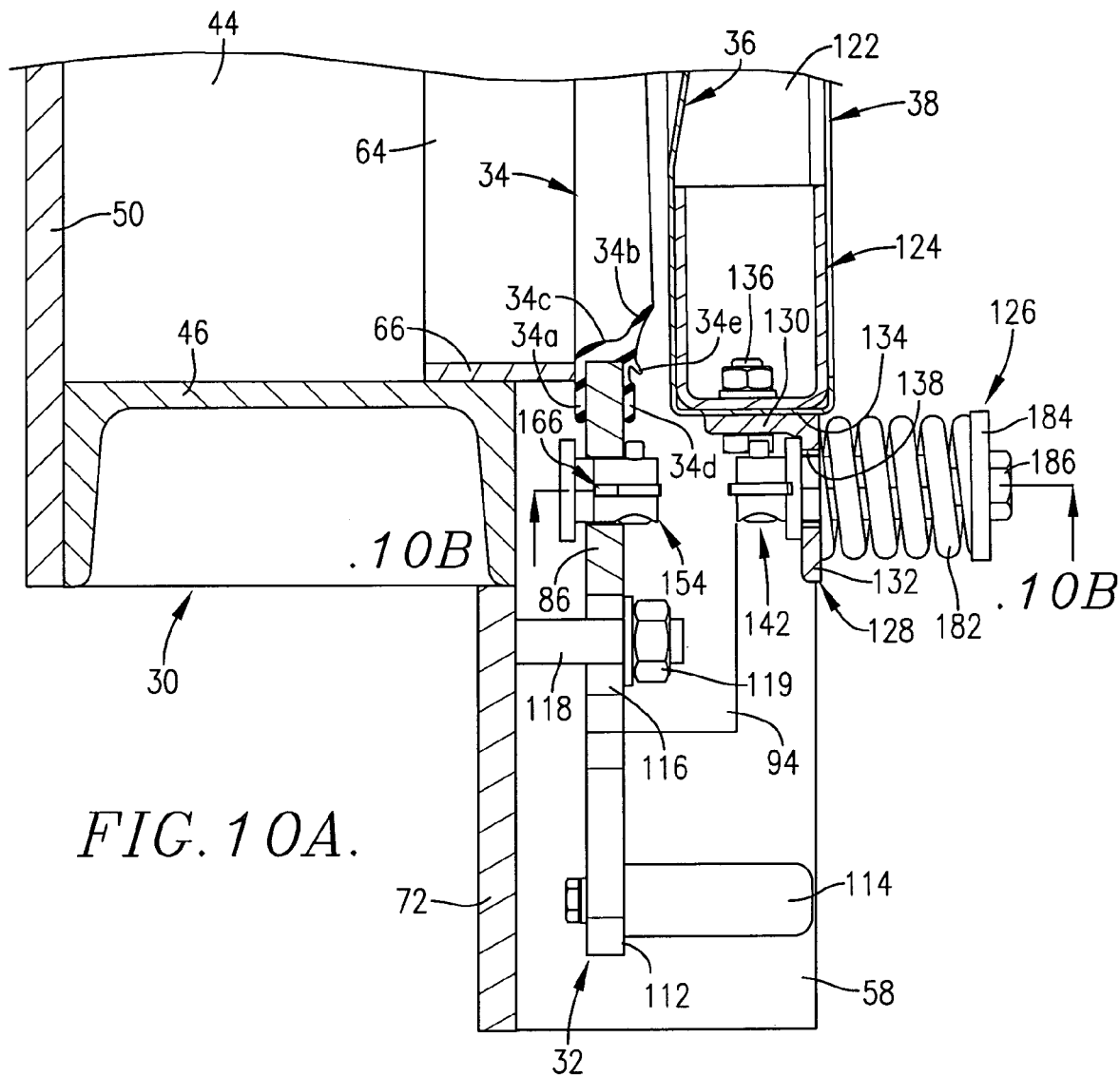
FIG. 10A is an enlarged fragmentary sectional view through one of the spring assembly and tab component structures immediately after rupture of the tab component and as the panel commences to open.

If, on the other hand, an overpressure of predetermined magnitude occurs downstream of explosion vent apparatus 20, the pressure required to effect opening of vent panel 36 is a function of the collective predetermined pressure required to rupture the waist portions 172 of all of the rupture tab components 166 as shown in FIG. 10. Upon rupture of all of the tab components 166, the vent panel support structure 38 commences to bend about the line 214 of central section 194 of vent panel 36 defined by the spaced slits 212. Utilization of a line of weakness for bending of the vent panel 36 in lieu of hinge structure, eliminates the risk of failure resulting from jamming of hinges, particularly under circumstances where apparatus 20, in most instances, will remain in place for long periods of time under a variety of meteorological conditions.

Figure 10B:
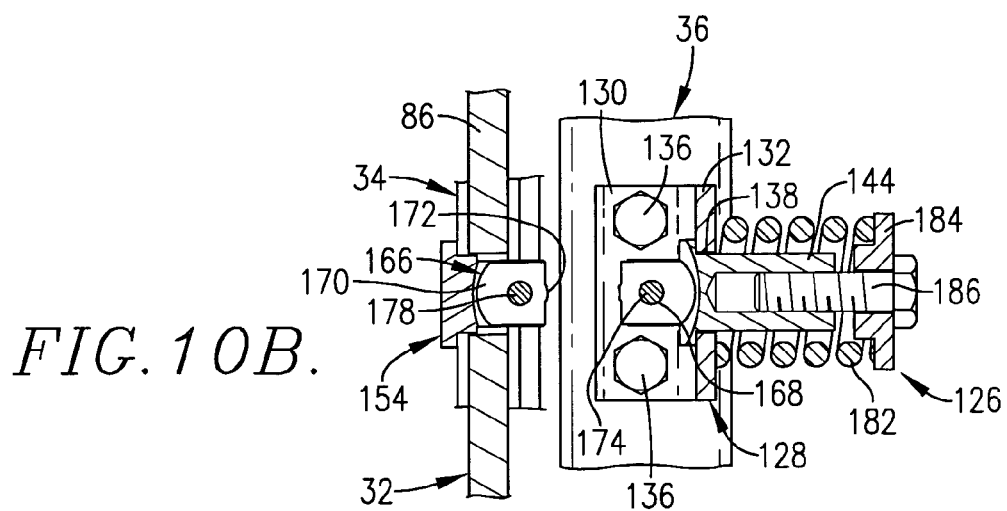
FIG. 10B is an enlarged fragmentary sectional view taken on the line 10B-10B of FIG. 10A and looking in the direction of the arrows.
Figure 11:
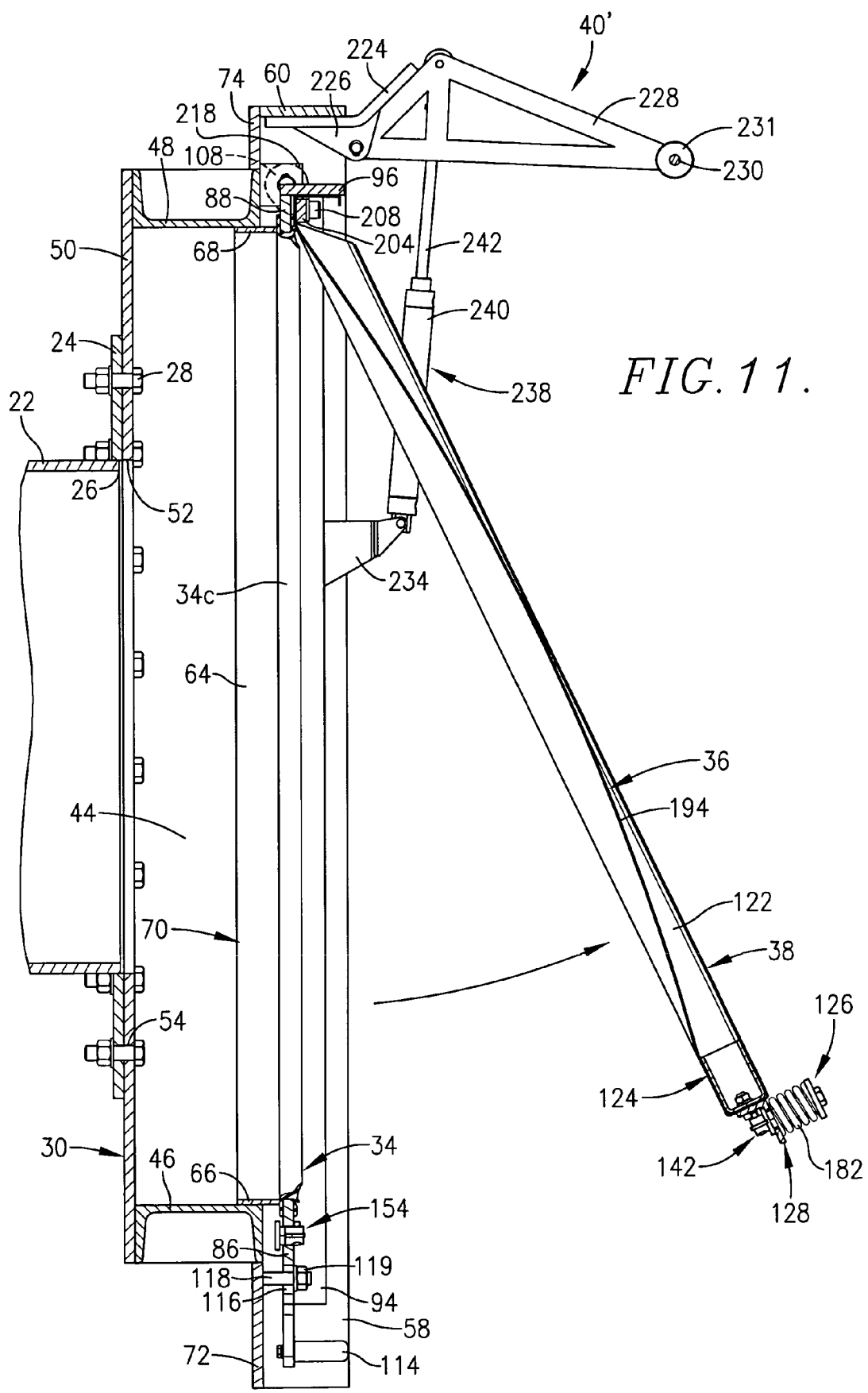
FIG. 11 is a vertical sectional view of the vent assembly that is similar to FIG. 8 and illustrates the vent panel at an intermediate position its movement toward a full opening position.
Figure 12:
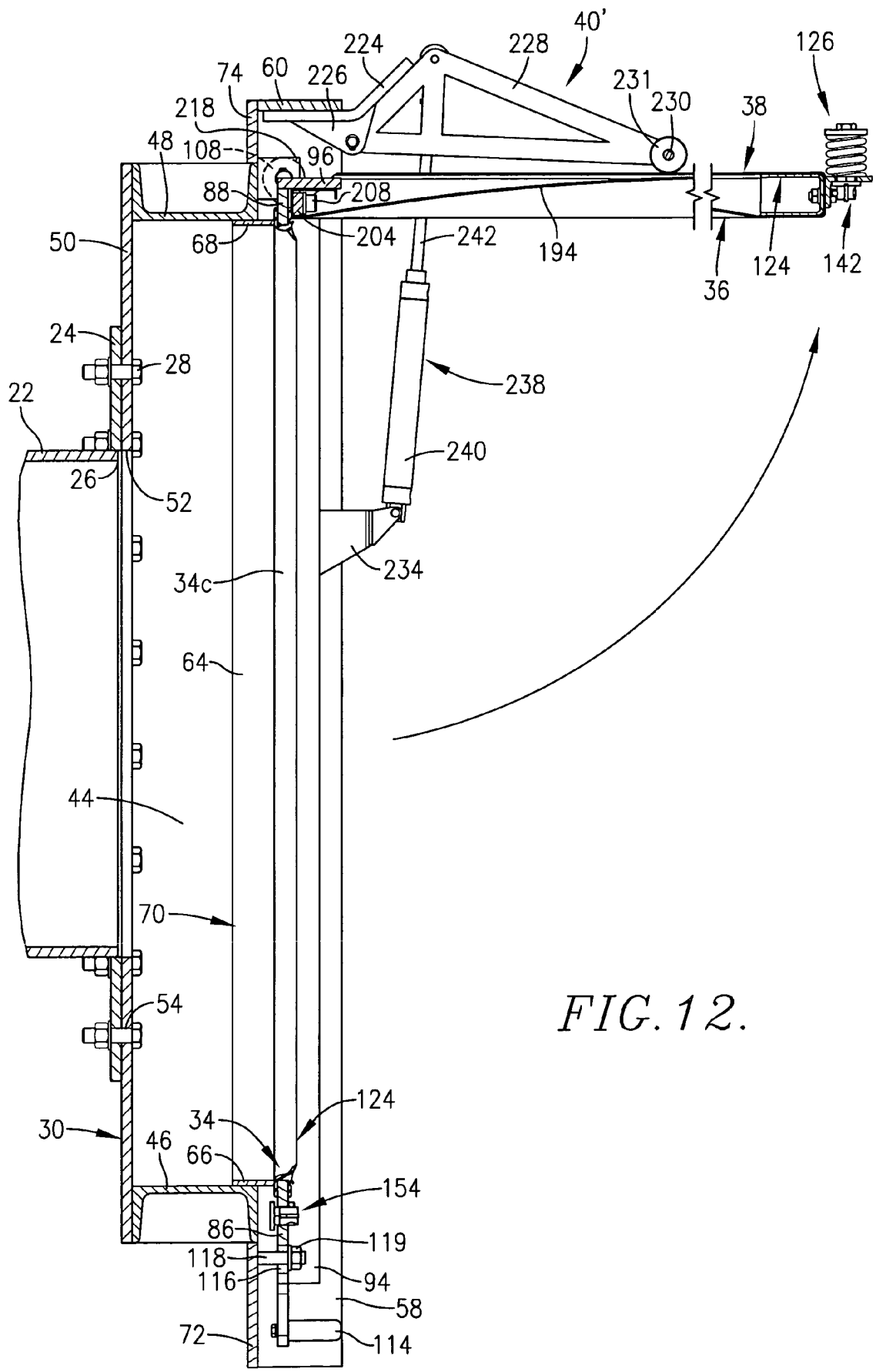
FIG. 12 is a vertical sectional view similar to FIG. 11, and illustrating the vent panel in its fully opened position.

In this high overpressure sequence of operation, the tab holding member 142 of assembly 126 moves outwardly under the force of springs 182 until the central flange section 148 of member 142 comes to rest against the lower face of a respective leg 130 of brackets 128, as shown in FIGS. 10, 10A and 10B. Continued movement of the vent panel support structure 38 carrying vent panel 36 during opening of the vent apparatus 20 is illustrated in FIG. 11 until the full opening position is reached as shown in FIG. 12. The overpressure is thereby fully vented. It is noteworthy that a pure tensile load is exerted on all of the tab components 166 with no significant shear forces being imparted to the tabs, thus assuring that the panel does not twist during opening and that the vent panel will be released to move to its open position at a preset overpressure.

Figure 13:
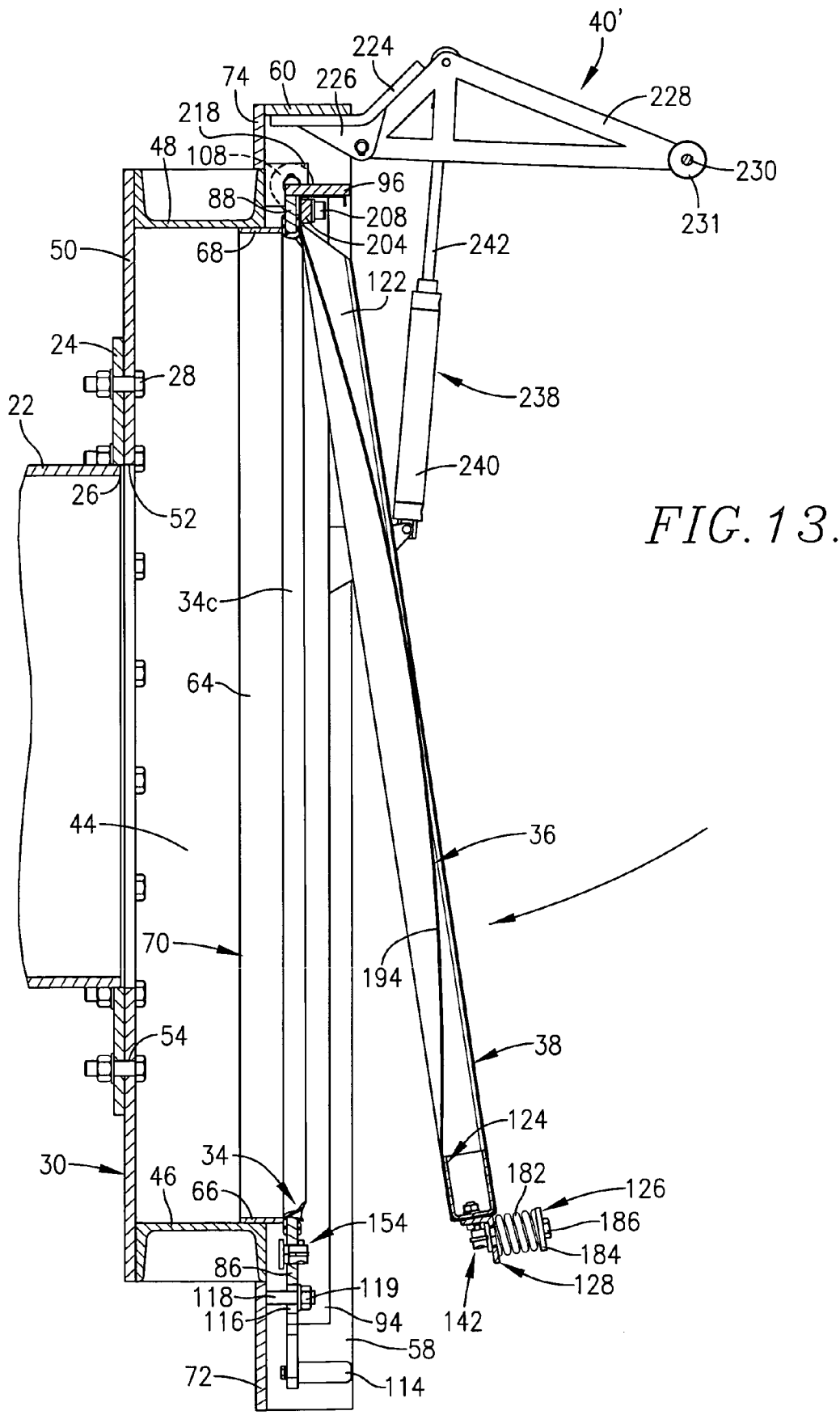
FIG. 13 is a vertical sectional view similar to FIG. 12, and illustrating the vent panel in a position during reclosure of the vent panel.
Figure 14:
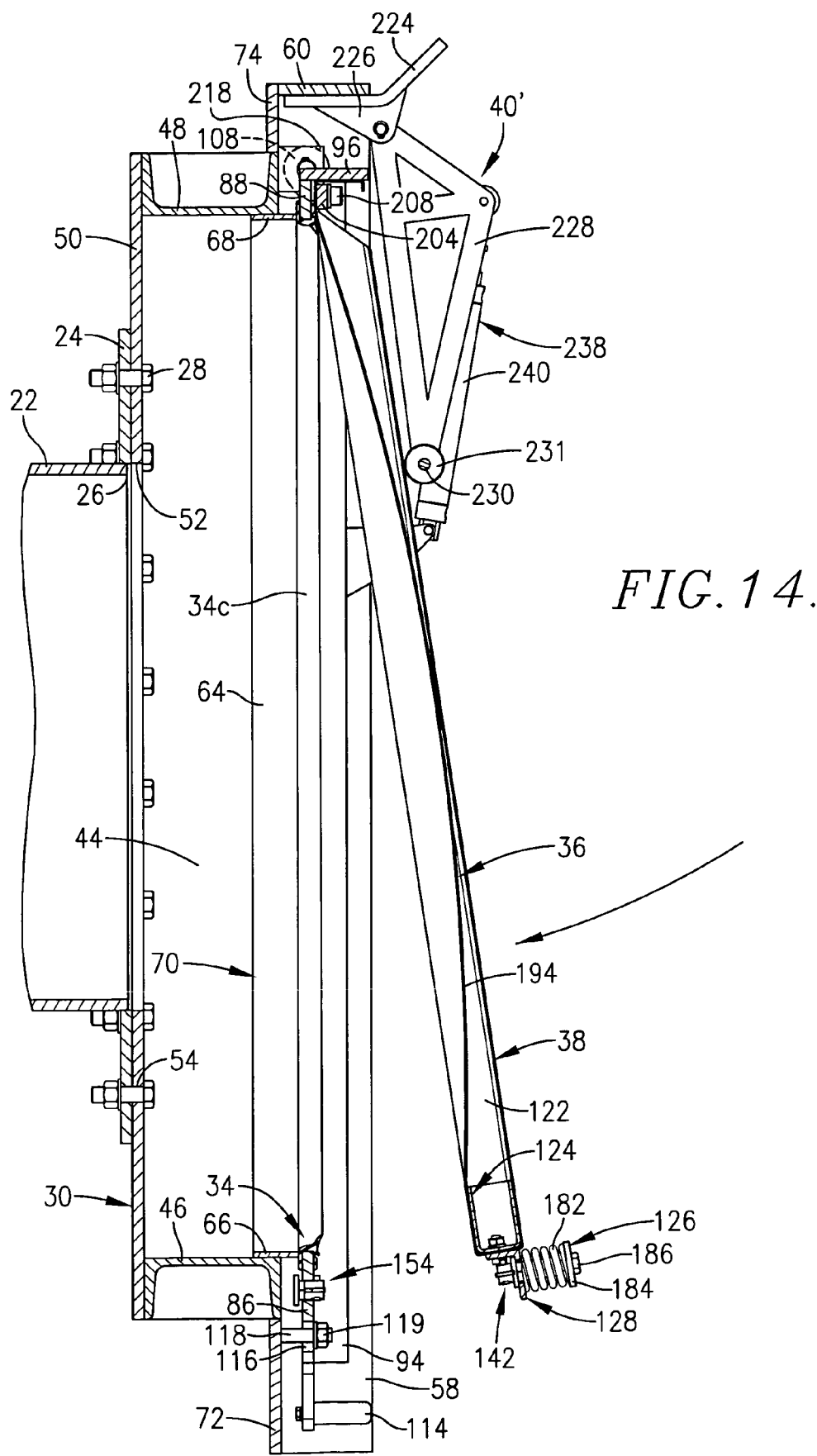
FIG. 14 is a vertical sectional view similar to FIG. 13, and illustrating initial contact of the fluid actuated vent reclosing mechanism with the partially reclosed vent panel.
Figure 15:
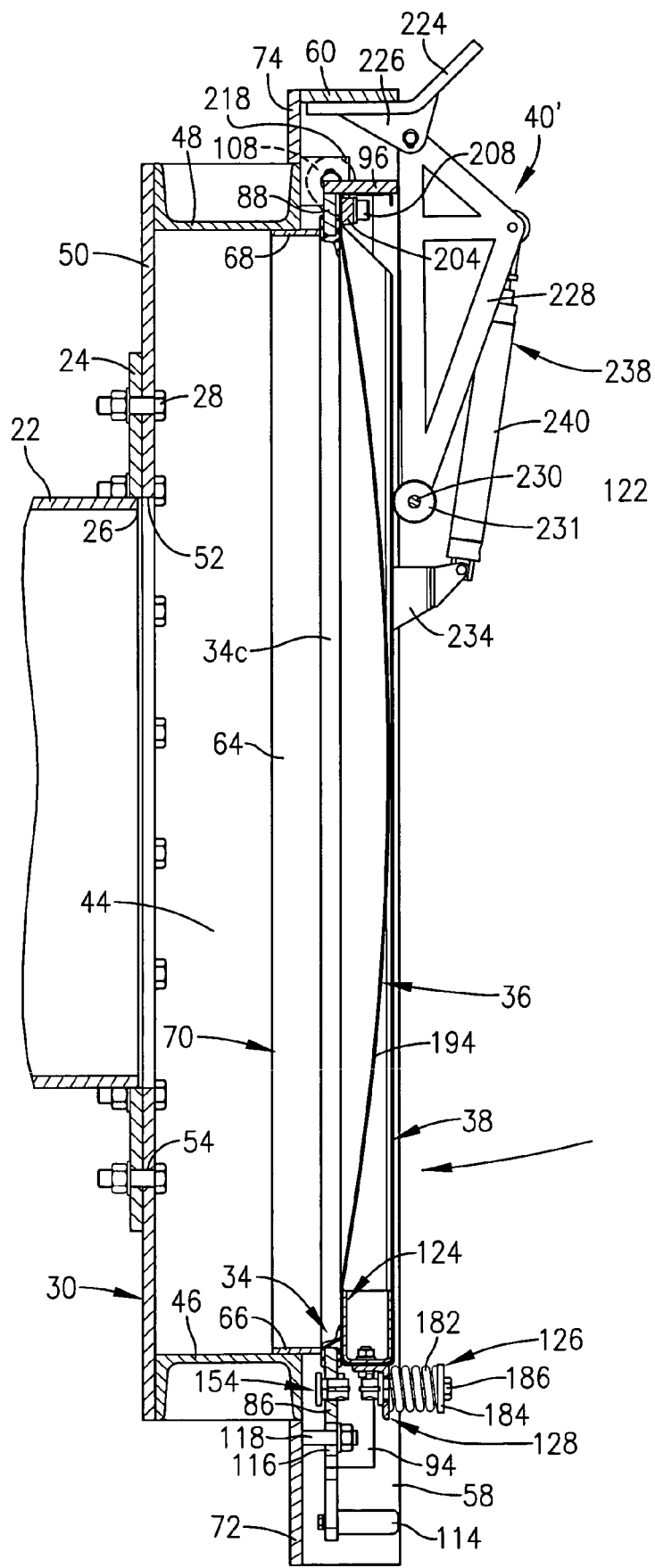
FIG. 15 is a vertical sectional view of the reclosed vent panel with the tab components in a ruptured condition, and with the fluid recloser being shown extended after it has shifted the vent panel back to its closed position.

The vent panel support structure carrying vent panel 36 may be returned to its closed position by selective actuation of the recloser mechanisms 40 and 40'. When pneumatic or hydraulic pressure is applied to the cylinders 240 of assemblies 238 in a direction to retract piston rods 242, the triangular supports 228 are rotated in a clockwise direction from their standby positions as shown in FIG. 13 to bring the rollers 231 and crossbar 230 into engagement with respective tubular members 20 and 22 of vent panel support structure 38. Rollers 231 ride along the upper surfaces of respective members 120 and 122 during closure of the structure 38 as shown in FIG. 14. Continued retraction of piston rods 242 into respective cylinders 240 causes crossbar 230 to return vent panel support structure 38 to its closed position with the periphery of vent panel 36 engaging the top leg 246 of gasket 34. Operation of mechanisms 40 and 40' may be accomplished automatically by provision of a rupture indicator such as a magnetic switch, inductive device, or rupture strip that senses the pressure has been relieved by full opening of the vent panel 36, with actuation of the fluid cylinder assemblies 238 being controlled by a PLC or EPC. Rapid closing of the vent panel 36, preferably within about 5 to 30 seconds, and most preferably within about 5 seconds, prevents back flow of air to the protected area that could cause a secondary explosion or re-initiation of an uncontrolled fire. Alternatively, in the event automatic control of return of the vent panel 36 to its closed condition is not deemed necessary, an individual may manually control initiating such actuation. Explosion vent apparatus 20 may be returned to its original overpressure protecting status by replacement of the individual tab components 166.

In the alternate vent apparatus 250 as illustrated in FIGS. 17 and 18, two torsion spring assemblies 252 and 254 are provided for reclosing the vent panel support structure 38 carrying vent panel 36, in lieu of the fluid actuated cylinder assemblies 238. Each of the assemblies 252 and 254 includes a cantilever mounted pin 256 secured to and projecting inwardly from respective side bars 92 and 94. The outwardly-projecting end leg 258 of each spring 252 and 254 underlies plate member 96 while the opposed inwardly-projecting, L-shaped leg 260 of each spring 252 and 254 overlies the tubular side members 120 and 122 respectively of vent panel support structure 38. Upon opening of the vent panel support structure 38 and vent panel 36 as previously described as a result of rupture of respective tab components 166, the legs 260 of torsion springs 252 and 254 rotate with the side members 120 and 122 thereby increasing the tension in each of the torsion springs. As soon as the overpressure condition in exhaust outlet 26 is relieved, the force of the torsion springs 252 and 254 effects rapid closure of the vent panel support structure 38 to its fully closed position.

Figure 19:
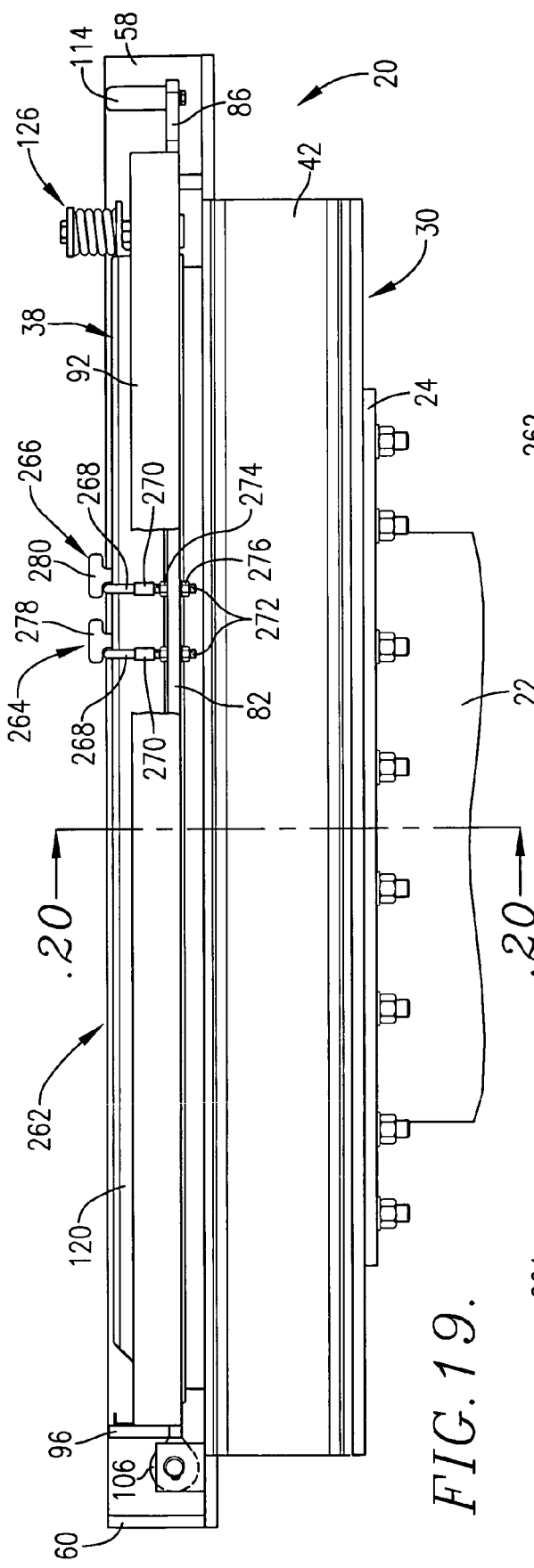
FIG. 19 is a side elevational view of the full opening and reclosable explosion vent apparatus having a pair of elastomeric bands secured to the vent support frame and wrapped over the vent panel support structure as other alternate structure for reclosing the vent panel, with a side panel of the vent support unit being removed and structure broken away to better illustrate the ferrules securing respective elastomeric bands to the vent support frame.
Figure 20:
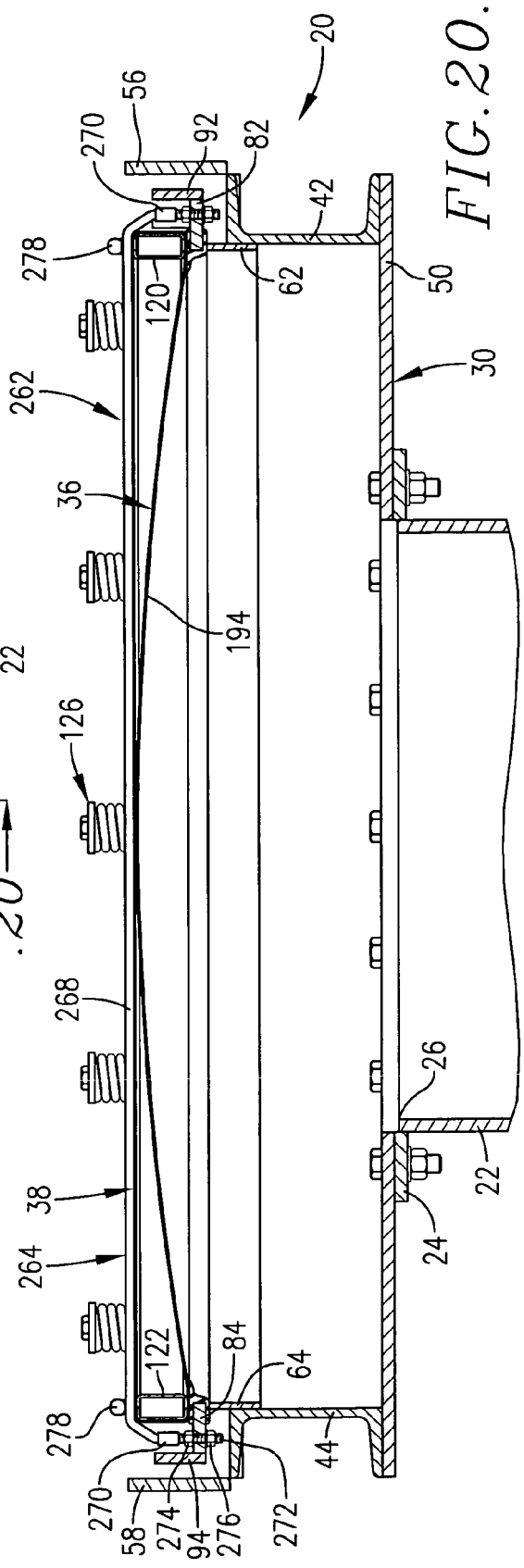
FIG. 20 is a vertical cross-sectional view taken substantially on the line 20-20 of FIG. 19 and looking in the direction of the arrows.

In the alternate vent apparatus 262 shown in FIGS. 19 and 20, the cylinder assemblies 238 are replaced by two elastomeric band units 264 and 266. Each unit 264 and 266 includes an elastomeric band 268 of rubber, synthetic rubber, or other elastomeric material. Ferrules 270 secured to opposed ends of each of the bands 268 has a threaded extension 272 that passes through the side legs 82 and 84 respectively of vent support frame 32. Nuts 274 and 276 on opposite sides of corresponding legs 82 and 84 secure respective ends of bands 268 to legs 82 and 84. It can be seen from FIG. 20 that bands 268 pass over and ride on the upper surface of tubular side members 120 and 122. Two T-shaped band retaining members 278 and 280 are mounted on each of the side members 120 and 122 in disposition somewhat closer to spring assemblies 126 than the pivot axes for vent panel support structure 38. The members 278 and 280 restrain bands 268 from shifting toward spring assemblies 126 during opening of the vent panel support structure 38. Upon relief of the overpressure condition in outlet 26, and as a result of stretching of the bands 268, the bands cooperate to effect immediate reclosing of vent panel support structure 38. It is preferred that two bands 268 be provided as a backup in the event one of the bands fails during actuation of vent apparatus 20, and to provide assurance that the vent will close upon pressure relief.

Figure 16:
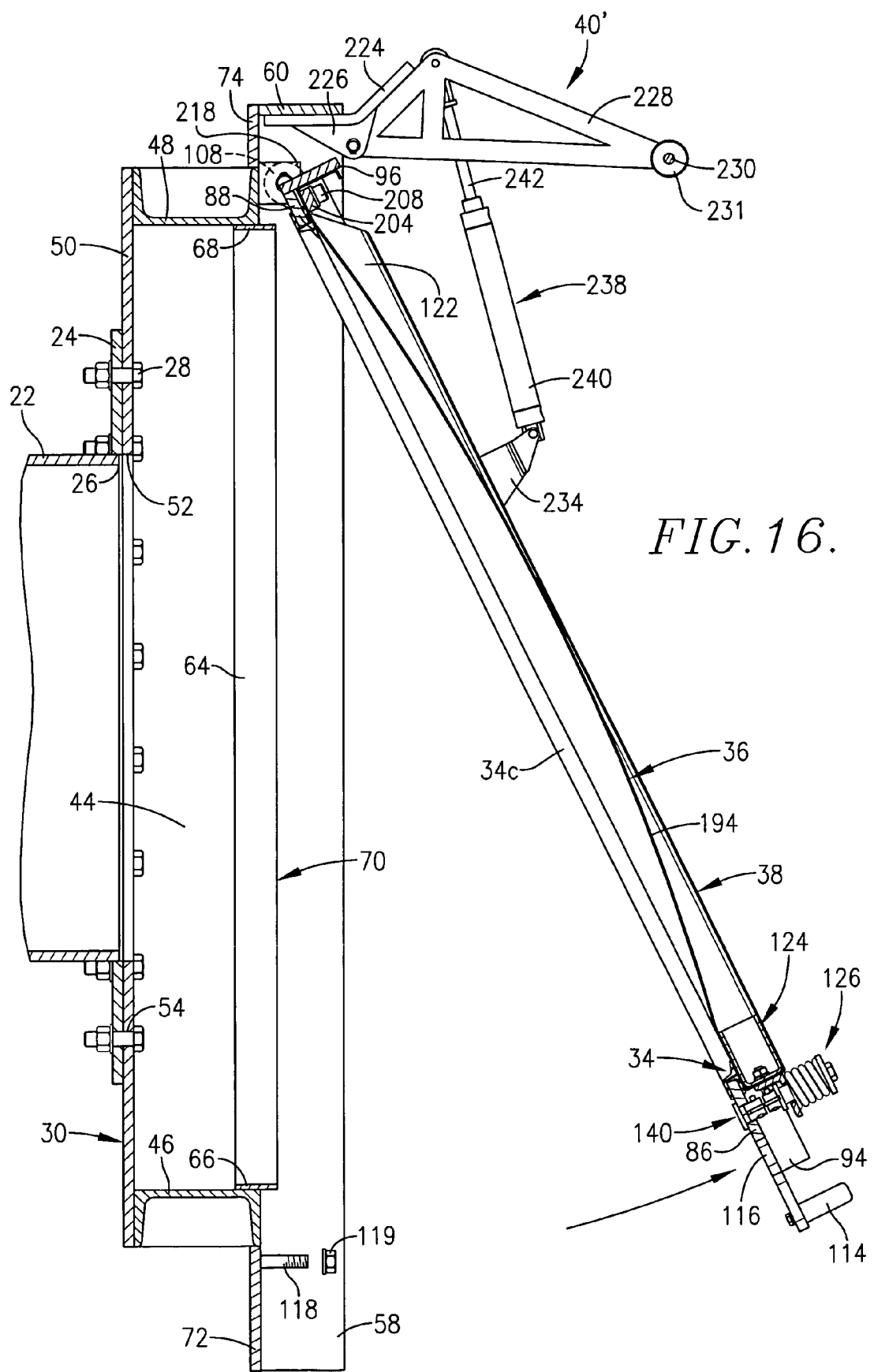
FIG. 16 is a vertical sectional view of the vent panel where the shiftable vent panel assembly has been manually opened for inspection of the protected area.

Another feature of explosion vent apparatus 20 is the ability to open the unit for inspection of the protected area therebehind. This is accomplished by removing the nuts 119 on studs 118 and pulling outwardly on handles 114 whereby the vent support frame carrying vent panel support structure 38 may be pivoted about the axes of hinge barrels 106 and 108 to an open position as shown in FIG. 16 permitting visual inspection of the area downstream of the vent apparatus 20. It is also to be noted that by virtue of bulging of central section 194 of vent panel 36, central section 194 is able to withstand a significant vacuum condition in the protected area behind apparatus 20 without deformation of the vent panel 36. Bulging of the central section 194 of vent panel 36 also contributes to prevention of failure of the central section 194 either by reversal or puncture as a result of pressure cycling in the protected area between positive and negative values, cycling of positive values, and/or cycling of negative pressures.

The overall dimensions of vent panel 36 are a function of the particular commercial application for explosion vent apparatus 20. For example, vent panels 36 may vary from 200 mm by 200 mm, to about 1110 mm by 1110 mm. A typical vent panel may be 566 mm by 900 mm. The sheet material from which panel 36 is fabricated may vary in thickness from about 0.25 mm to about 3 mm with the preferred thickness being 1.5 mm. When apparatus 20 is fabricated of materials and constructed to fully open as shown in FIG. 12 at a typical overpressure of, for example, 100 millibars, it is preferred that the vent support frame 32 supporting vent panel 36 open against the pressure of springs 182 without rupture of the individual tab components 126 at a pressure of from about 30% to about 90%, and preferably about 30% to 40%, of the full opening overpressure.

The tab components 166 are preferably fabricated from stainless steel sheet material having a thickness of from about 1 mm to about 2 mm, with 2 mm being preferred. In the case of tab component 166 which is 2 mm thick, the reduced waist portion 172 is preferably about 1 mm wide. Where 1 mm thick sheet material is utilized for fabrication of tab components 166, the reduced waist portion 172 is preferably about 2 mm wide. Tab components 166 may be fabricated of materials other than stainless steel, particularly where added corrosion resistance is desired, including but not limited to temperature-independent materials such as Inconel, Hastaloy, Incoloy, Monel, titanium, palladium, gold, and similar metals. The use of exotic metals is feasible in apparatus 20 because the tab components 166 are a very small percentage of the overall structure of the vent apparatus.

In the exemplary embodiment of apparatus 20 having a vent panel 36 that is 1000 mm by 1000 mm, and that is adapted to fully open at 100 millibars with partial opening at 30% to 40% of the full opening pressure, springs 182 may be employed that are about 67.5 mm in length, have a diameter of 28.5 mm, and the bar stock from which springs 182 are fabricated has a diameter of 4.5 mm. The resistance to compression of these exemplary springs 182 is preferably about 32.8 newtons per mm. In order to meet a 30-40 millibar specification for partial opening of the vent panel 36, each of the springs 182 is preferably pre-tensioned under a force of about 1 newton meter.

The reclosable explosion vent apparatus 20 incorporates a number of significant features and unique improvements including:

The rupture tab components 166 are loaded with pure tensile strength which results in a very controlled, predictable burst pressure. Tensile strength tests can be conducted on particular tab component 166 designs instead of the standard panel burst tests conventionally employed to determine the rupture value for a particular rupture-type vent based on type of material, thickness of the metal, configuration, if any, of score lines or slit lines of weakness, and shape and size of the vent panel. Test data from tensile strength tests of sample tabs from a known lot of sheet metal can be used to prepare for manufacture of tabs without the need for testing of a predetermined number of tabs from that lot.

Utilization of springs and particularly multiple springs for controlling partial opening of the panel, and that must also compress before respective tab components can rupture, minimizes manufacturing tolerance differences between parts, such as the tab components and the attachment structures for the tab components.

The apparatus of this invention also offers prevention of fall through by individuals walking on the units when they are mounted horizontally rather than vertically.

There are no dead corners or spaces in explosion vent apparatus 20, and the gasket 34 is of one-piece construction, thus providing an assembly that will meet CIP (clean-in-place) standards for aseptic applications.

The moving parts of apparatus 20 are of low mass and therefore exhibit a low Pred (pressure reduction). The weakening of the bend line 214 of vent panel 36 defined by slits 212 provides a controlled hinge point and reduces deformation of central section 194 of vent panel 36 when the explosion vent opens and improves the ease of closing again with the pneumatic or hydraulic actuator such as mechanism 40, 40'. When the vent apparatus 20 is mounted in an upright position, the vent panel support structure 38 along with vent panel 36 can partially close by gravity.

After an explosion, most conventional explosion vents are heavily deformed or even rupture and they remain open. This results in a continuous supply of air, including oxygen, which can stir up the flames again or cause a secondary explosion. Prompt reclosing of explosion vent apparatus 20 and reestablishment of the seal between gasket 34 and rail 70 precludes ingress of oxygen/air to the protected area and significantly limits continuation of a fire or occurrence of a secondary explosion.

There are limited moving parts, thereby increasing reliability of the apparatus.

The protected process and the condition of the vent apparatus can be readily inspected visually.

Explosion vent apparatus 20 is resistant to full vacuum.

Apparatus 20 is easy to assemble and operator independent.

The apparatus exhibits a high operating ratio and functions in a manner similar to an overpressure valve.

Opening pressure is assured independent of process temperatures and media.

Modular design allows the manufacturer to stock all of the component parts except for rupture tab components fabricated to meet particular operating specifications.

The provision of a one-piece gasket of U-shaped configuration assures the seal provided by the gasket is substantially leakproof, even when the apparatus remains in a standby inactivated position for long periods of time, especially in view of the continuous, uninterrupted edge seal of rail 70 with leg 34a of gasket 34.

We claim:

1. Explosion vent apparatus comprising:
a vent support unit adapted to be positioned over the outlet of an area to be protected from an overpressure condition,
said support unit defining a vent opening aligned with the outlet;
a vent panel movably mounted on said unit in a closed position blocking the outlet, said panel being movable from said closed position to open overpressure-relieving positions; and
structure on the unit connected to the vent panel normally maintaining the vent panel in the closed position thereof,
said structure being operable to allow movement of the vent panel through a first displacement away from said closed position to a first open overpressure-relieving position upon application of an overpressure of one magnitude of pressure against the vent panel, and permitting movement of the panel through a second and greater displacement than said first displacement to a second open overpressure-relieving position upon application of an overpressure of a second magnitude of pressure higher than said one magnitude of pressure against the vent panel,
wherein said structure that normally maintains the vent panel in the closed position thereof includes a plurality of spaced, laterally aligned rupturable tab components oriented in disposition such that tension forces are exerted on the tab components when an overpressure is applied to the vent panel, said tab components resisting rupture while allowing the vent panel to move through said first displacement to said first open overpressure-relieving position when an overpressure of said first magnitude of pressure is a lied to the vent panel, said tab components collectively undergoing rupture when an overpressure of said second magnitude of pressure is applied to the vent panel and allowing the vent panel to move through said second displacement thereof to said second open overpressure-relieving position.

2. Explosion vent apparatus as set forth in claim 1, wherein said panel is movable from said closed position to a first partially open overpressure-relieving position upon application of an overpressure of said one magnitude of pressure against the vent panel, and movable from said closed position to a second fully open overpressure-relieving position on application of an overpressure of said second magnitude of pressure against the vent panel.

3. Explosion vent apparatus as set forth in claim 1, wherein said vent panel is constructed to resist rupture thereof when a pressure of said one magnitude is applied to the vent panel.

4. Explosion vent apparatus as set forth in claim 1, wherein said vent panel is constructed to resist rupture thereof when a pressure of said second magnitude is applied to the vent panel.

5. Explosion vent apparatus as set forth in claim 1, wherein said vent panel is operable to return to the closed position thereof blocking said outlet upon relief of pressure of said first and of said second magnitude.

6. Explosion vent apparatus as set forth in claim 1, wherein each of said tab components has two end portions and a central portion between the end portions, said central portion defining a waist portion of less width than the width of the end portions of each of said tab components.

7. Explosion vent apparatus as set forth in claim 6, wherein each of said tab components has opposed side margins, and a notch extending inwardly from each side margin, said notches being aligned laterally of the side margins of the tab components and cooperating to define said waist portion of each of said tab components.

8. Explosion vent apparatus as set forth in claim 1, wherein is provided a resilient member interposed between each tab component and the vent panel that collectively applies a compressive force on the vent panel sufficient to prevent the vent panel from moving through said first displacement until an overpressure of said one magnitude of pressure is applied against the vent panel.

9. Explosion vent apparatus as set forth in claim 1, wherein is provided return structure operably associated with the vent panel for returning the vent panel to the closed position thereof after movement of the vent panel through said second displacement thereof to relieve an overpressure of said second magnitude of pressure.

10. Explosion vent apparatus as set forth in claim 9, wherein said return structure includes a fluid pressure actuated device for reclosing the vent panel after opening thereof under an overpressure condition.

11. Explosion vent apparatus as set forth in claim 10, wherein said fluid pressure actuated device includes a recloser mechanism having components that actuate the pressure actuated device only after the vent panel has opened to a predetermined extent, and that then return the vent panel to its closed position upon relief of pressure.

12. Explosion vent apparatus as set forth in claim 9, wherein said return structure includes torsion springs in disposition and that are operable to return the vent panel to its closed position upon relief of pressure.

13. Explosion vent apparatus as set forth in claim 9, wherein said return structure includes elastomeric band unit structure in disposition and that are operable to return the vent panel to its closed position upon relief of pressure.

14. Explosion vent apparatus as set forth in claim 1, wherein is provided a frame carrying said vent panel, said frame being pivotally mounted on the support unit, releasable connectors for securing the frame to the support unit, said frame and the vent panel being pivotal into disposition allowing inspection of the outlet thereunder.

15. Explosion vent apparatus as set forth in claim 1, wherein said vent panel is provided with a series of slits defining a line thereof remote from said structure and presenting a line of weakness along the vent panel for bending movement of the vent panel along said line of weakness when moving from the closed position to said second open overpressure-relieving position.

16. Explosion vent apparatus as set forth in claim 1, wherein the vent panel has a central bulged section.

17. Explosion vent apparatus comprising:
  a vent support unit adapted to be positioned over the outlet of an area to be protected from an overpressure condition,
  said support unit defining a vent opening aligned with the outlet;
  a vent panel pivotally mounted on said unit in a closed position blocking the outlet, said panel being pivotal from said closed position to an open overpressure-relieving position; and
  structure on the unit connected to the vent panel maintaining the vent panel in the closed position thereof,
  said structure being operable to allow pivoting of the vent panel through a sufficient first displacement away from said closed position to a first open overpressure-relieving position upon application of an overpressure against the vent panel to relieve the overpressure without rupture of the vent panel, said vent panel further being operable to return to the closed position thereof blocking said outlet upon relief of said overpressure condition,
  wherein said structure includes a plurality of spaced, laterally-aligned tab components that normally maintains the vent panel in the closed position thereof, said tab components being oriented in disposition such that tension forces are exerted on the tab components when an overpressure is applied to the vent panel, said tab components collectively undergoing rupture when an overpressure of a predetermined magnitude is applied to the vent panel, allowing the vent panel to move through a second and greater displacement to a second open position for relieving the overpressure condition,
  wherein is provided a resilient member interposed between each tab component and the vent panel that collectively applies a predetermined compressive force on the vent panel sufficient to prevent the vent panel from moving through said second displacement to said second open position until an overpressure of said predetermined magnitude of pressure is applied against the vent panel.

18. Explosion vent apparatus as set forth in claim 17, wherein each of said tab components includes a tab having at least two sections, one of the sections being of lesser width than the other section.

19. Explosion vent apparatus as set forth in claim 18, wherein the width of said one section of each of the tab components is variable to control the magnitude of the overpressure applied to the vent panel required to effect rupture of all of the tab components.

20. Explosion vent apparatus as set forth in claim 17, wherein each of said tab components includes a tab having two end sections and an intermediate section, the intermediate section being of lesser width than the end sections.

21. Explosion vent apparatus as set forth in claim 17, wherein each of said resilient members includes a spring interposed between a respective tab component and the vent panel, the compressive force of said springs being adjustable to control the amount of overpressure that must be applied to the vent panel before opening thereof.

22. Explosion vent apparatus as set forth in claim 17, wherein is provided a mechanism engageable with the vent panel for returning the vent panel to its closed position after movement of the vent panel to said first open overpressure-relieving position thereof.

23. Explosion vent apparatus as set forth in claim 17, wherein is provided a gasket sealing the perimeter of the vent panel in its closed position.

24. Explosion vent apparatus as set forth in claim 23, wherein said gasket is of U-shaped cross-sectional configuration.

25. Explosion vent apparatus as set forth in claim 17, wherein is provided hinges connecting one margin of the vent panel to the support unit allowing manual pivoting of the vent panel through an arc allowing visual inspection of the outlet and the area downstream therefrom.

* * * * *